US012640825B2

(12) United States Patent
He et al.

(10) Patent No.: US 12,640,825 B2
(45) Date of Patent: May 26, 2026

(54) ANTENNA DETECTION METHOD, APPARATUS, DEVICE, AND STORAGE MEDIUM

(71) Applicant: HUAWEI TECHNOLOGIES CO., LTD., Shenzhen (CN)

(72) Inventors: Gaoning He, Boulogne Billancourt (FR); Lei Wang, Shanghai (CN); Jianbiao Xu, Shenzhen (CN); Ganghua Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 293 days.

(21) Appl. No.: 18/598,178

(22) Filed: Mar. 7, 2024

(65) Prior Publication Data

US 2024/0214088 A1    Jun. 27, 2024

Related U.S. Application Data

(63) Continuation of application No. PCT/CN2022/114944, filed on Aug. 25, 2022.

(30) Foreign Application Priority Data

Sep. 8, 2021    (CN) .......................... 202111052444.6

(51) Int. Cl.
*H04B 17/318* (2015.01)
*H04B 17/27* (2015.01)
(52) U.S. Cl.
CPC ........... *H04B 17/318* (2015.01); *H04B 17/27* (2015.01)

(58) Field of Classification Search
None
See application file for complete search history.

(56) References Cited

U.S. PATENT DOCUMENTS

| 11,476,904 | B2 * | 10/2022 | Monir Vaghefi | ..... | H04B 7/0417 |
| 2004/0127247 | A1 * | 7/2004 | Reece | .................... | H01Q 1/242 |
| | | | | | 455/562.1 |
| 2008/0261535 | A1 * | 10/2008 | Weil | ..................... | H04B 17/309 |
| | | | | | 455/67.11 |

(Continued)

FOREIGN PATENT DOCUMENTS

| EP | 3713312 | A1 * | 9/2020 | .......... H04W 52/242 |
| WO | 2021159493 | A1 | 8/2021 | |

OTHER PUBLICATIONS

Extended European Search Report issued in EP22866436.3, dated Oct. 30, 2024, 8 pages.

*Primary Examiner* — Bernarr E Gregory

(57)    ABSTRACT

An antenna detection method, an apparatus, a device, and a storage medium are disclosed. The method includes: A first terminal device sends a first detection signal to a network device. The first detection signal is used to determine at least one first antenna sub-array corresponding to the first terminal device. A plurality of antenna sub-arrays of the network device includes the at least one first antenna sub-array. A time interval at which the first detection signal is sent is related to spatial non-stationary coherence time. The first terminal device obtains first information from the network device. The first information indicates to perform information transmission through the at least one first antenna sub-array corresponding to the first terminal device.

20 Claims, 7 Drawing Sheets

(56)     References Cited

U.S. PATENT DOCUMENTS

| | | | | | |
|---|---|---|---|---|---|
| 2016/0219534 | A1* | 7/2016 | Hao | .................... | H04W 52/146 |
| 2018/0145742 | A1* | 5/2018 | Li | ........................ | H04B 7/0874 |
| 2019/0341984 | A1 | 11/2019 | Zhu et al. | | |
| 2021/0329619 | A1* | 10/2021 | Raghavan | ............ | H04B 7/0617 |
| 2021/0337530 | A1* | 10/2021 | Raghavan | .......... | H04B 7/06956 |

* cited by examiner

100

110     120     130

140

200

A1    A2    A3    A4

221     222     223

400

500

Figure 6:
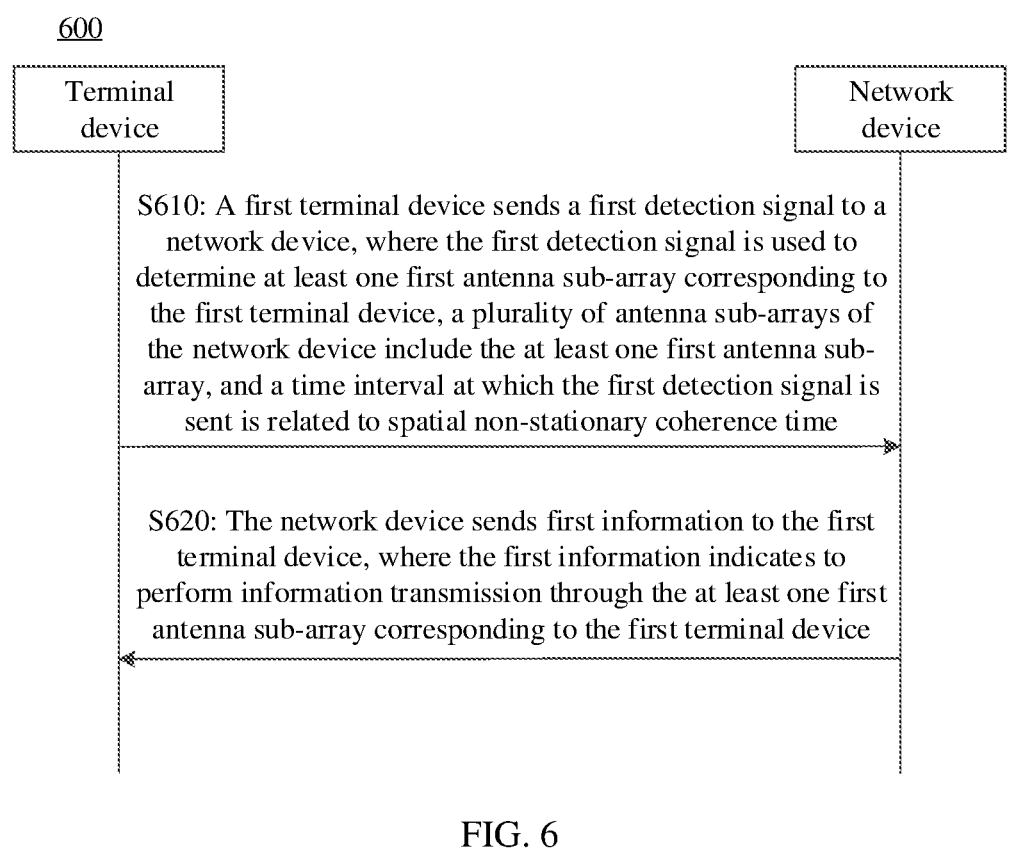

600

| Terminal device | | Network device |
|---|---|---|

S610: A first terminal device sends a first detection signal to a network device, where the first detection signal is used to determine at least one first antenna sub-array corresponding to the first terminal device, a plurality of antenna sub-arrays of the network device include the at least one first antenna sub-array, and a time interval at which the first detection signal is sent is related to spatial non-stationary coherence time S620: The network device sends first information to the first terminal device, where the first information indicates to perform information transmission through the at least one first antenna sub-array corresponding to the first terminal device

ANTENNA DETECTION METHOD, APPARATUS, DEVICE, AND STORAGE MEDIUM

CROSS-REFERENCE TO RELATED APPLICATION

This application is a continuation of International Application No. PCT/CN2022/114944, filed on Aug. 25, 2022, which claims priority to Chinese Patent Application No. 202111052444.6, filed on Sep. 8, 2021. The disclosures of the aforementioned applications are hereby incorporated by reference in their entireties.

This application relates to the field of communication technologies, and in particular, to an antenna detection method, an apparatus, a device, and a storage medium.

BACKGROUND

In some communication systems, for example, a 5th generation mobile communication system (5G), with continuous development of the multiple-input multiple-output (MIMO) technology, the massive antenna (massive MIMO) technology and even the extremely large aperture array (ELAA) will be used more widely. In this scenario, both a network device and a terminal device need to perform information communication through a full-array antenna. Consequently, it is more complex for the network device and the terminal device to process a baseband signal, and information communication efficiency is reduced.

SUMMARY

Embodiments of this application provide an antenna detection method, an apparatus, a device, and a storage medium, to make baseband signal processing less complex, and improve information communication efficiency.

According to a first aspect, embodiments of this application provide an antenna detection method, including: A first terminal device sends a first detection signal. The first detection signal is used to determine at least one first antenna sub-array corresponding to the first terminal device. A plurality of antenna sub-arrays of a network device include the at least one first antenna sub-array. A time interval at which the first detection signal is sent is related to spatial non-stationary coherence time. The first terminal device obtains first information. The first information indicates to perform information transmission through the at least one first antenna sub-array corresponding to the first terminal device.

According to the antenna detection method provided in the first aspect, the first terminal device determines the at least one first antenna sub-array that is in the plurality of antenna sub-arrays and corresponds to the first terminal device, so that the network device and the first terminal device perform information transmission based on the corresponding at least one first antenna sub-array. In this way, it is less complex for the first terminal device to process a baseband signal, and information communication efficiency is improved.

Further, in an embodiment of this application, the first terminal device performs detection on the plurality of antenna sub-arrays of the network device based on the first detection signal related to the spatial non-stationary coherence time, to determine the corresponding at least one first antenna sub-array. In this way, a detection cycle for antenna detection is not limited by channel coherence time, and the detection cycle for antenna detection is more flexible and controllable.

In a possible implementation, the time interval at which the first detection signal is sent is shorter than the spatial non-stationary coherence time.

According to the antenna detection method provided in this implementation, antenna detection is performed within the spatial non-stationary coherence time, so that the at least one first antenna sub-array currently corresponding to the first terminal device may be obtained in time.

However, if the time interval at which the first detection signal is sent is longer than the spatial non-stationary coherence time, it indicates that a transmission frequency of the first detection signal is lower than a change rate of spatial non-stationarity, and when the at least one first antenna sub-array corresponding to the first terminal device changes, at least one changed first antenna sub-array cannot be learned in time.

In a possible implementation, the first information includes a matching matrix. The matching matrix indicates at least one first antenna sub-array that is in the plurality of antenna sub-arrays and corresponds to each of n terminal devices. The n terminal devices include the first terminal device. The matching matrix includes a plurality of matching elements. The matching element indicates a degree of matching between an $i^{th}$ terminal device in the n terminal devices and a second antenna sub-array in the plurality of antenna sub-arrays. The second antenna sub-array is one of the plurality of antenna sub-arrays. n is an integer greater than or equal to 1, and i is an integer less than or equal to n and greater than or equal to 1.

According to the antenna detection method provided in this implementation, the first terminal device obtains the matching matrix, to obtain degrees of matching, indicated by the matching matrix, between each terminal device and each antenna sub-array. In one aspect, the first terminal device may quickly and accurately determine the at least one first antenna sub-array matching each terminal device that performs information transmission with the network device, and then may perform information transmission with the network device through the at least one first antenna sub-array corresponding to the first terminal device. In this way, it is less complex for the first terminal device to process a baseband signal, and processing efficiency is improved. In another aspect, the first terminal device may determine terminal devices that reuse each antenna sub-array of the network device, in other words, determine a reuse status of each antenna sub-array, so that the first terminal device may perform, based on the reuse status of each antenna sub-array, information communication in which signals (for example, SRS signals) transmitted and/or received by terminal devices that do not reuse an antenna sub-arrays may be signals with a same sequence, in comparison with information communication in a full-array antenna scenario. This reduces signaling overheads.

In a possible implementation, the degree of matching is related to signal strength of first detection signal obtained by the second antenna sub-array. The matching element indicates signal strength of the first detection signal obtained by the second antenna sub-array, the matching element indicates a result of comparison between signal strength of the first detection signal obtained by the second antenna sub-array and a first threshold, or the matching element indicates results of comparison between signal strength of the first detection signal obtained by the second antenna sub-array and a plurality of threshold ranges.

According to the antenna detection method provided in this implementation, higher signal strength of the first detection signal obtained by the second antenna sub-array indicates a higher degree of matching between the second antenna sub-array and the $i^{th}$ terminal device. In this way, a degree of matching indicated by a matching element in the matching matrix is more accurate.

In a possible implementation, the matching element indicates the signal strength of the first detection signal received by the second antenna sub-array. When the matching element is greater than or equal to a second threshold, the second antenna sub-array is the first antenna sub-array that performs information transmission with the terminal device.

According to the antenna detection method provided in this implementation, the degree of matching, indicated by the matching element in the matching matrix, between the $i^{th}$ terminal device and the second antenna sub-array is more accurate. The first terminal device may obtain the matching matrix, to accurately obtain a degree of matching between each terminal device and each second antenna sub-array. In this way, the first antenna sub-array determined based on the second threshold matches the first terminal device better.

In a possible implementation, when the signal strength of the first detection signal is greater than or equal to the first threshold, the matching element is a first character. The first character indicates that the second antenna sub-array is the first antenna sub-array that performs information transmission with the terminal device. Alternatively, when the signal strength of the first detection signal is less than the first threshold, the matching element is a second character. The second character indicates that the second antenna sub-array is not the first antenna sub-array that performs information transmission with the terminal device.

According to the antenna detection method provided in this implementation, the matching element in the matching matrix may explicitly indicate whether the second antenna sub-array is the first antenna sub-array corresponding to the $i^{th}$ terminal device. Both the network device and the $i^{th}$ terminal device may quickly identify, based on the matching matrix, at least one first antenna sub-array corresponding to each terminal device. This improves processing efficiency In a possible implementation, the plurality of threshold ranges one-to-one correspond to a plurality of degrees of matching. The matching element is a character corresponding to a threshold range within which the signal strength of the first detection signal falls. The character corresponding to the threshold range indicates a degree of matching corresponding to the threshold range.

Compared with a solution in which the matching matrix indicates a result of comparison between the signal strength of the first detection signal received by the second antenna sub-array and the first threshold, the antenna detection method provided in this implementation enables the matching matrix to indicate a degree of finer-granularity matching, to improve accuracy with which the first information indicates a degree of matching between one second antenna sub-array and the first terminal device. Compared with the matching matrix indicating the signal strength of the first detection signal received by the second antenna sub-array, the matching matrix in this implementation makes it easier for the first terminal device to determine the first antenna sub-array corresponding to the first terminal device. This improves processing efficiency.

In a possible implementation, the character corresponding to the threshold range is a preset value or is greater than or equal to a preset value. The second antenna sub-array corresponding to the matching element is the first antenna sub-array that performs information transmission with the terminal device.

According to the antenna detection method provided in this implementation, when the character corresponding to the matching element is the preset value or is greater than or equal to the preset value, the first terminal device determines that the second antenna sub-array is the first antenna sub-array corresponding to the first terminal device. In this way, the first antenna sub-array is accurately identified.

In a possible implementation, the first information includes a channel sounding reference signal SRS sequence set. The SRS sequence set is determined based on the at least one first antenna sub-array corresponding separately to the n terminal devices. The n terminal devices include the first terminal device. n is an integer greater than or equal to 1.

According to the antenna detection method provided in this implementation, the first terminal device may obtain the SRS sequence set by obtaining the first information sent by the network device. The SRS sequence set may support the first terminal device to perform information transmission with the network device through the at least one corresponding first antenna sub-array. The first terminal device does not need to generate the SRS sequence. This improves processing efficiency In a possible implementation, the method further includes: The first terminal device sends a first SRS sequence to the network device. The first SRS sequence is determined based on the first information.

According to the antenna detection method provided in this implementation, the first SRS sequence is applicable to information communication between the first terminal device and the network device through the at least one first antenna sub-array. Compared with information communication through the full-array antenna of the network device, the information communication using the first SRS sequence reduces pilot overheads.

In a possible implementation, at least time-domain resources, frequency-domain resources, or code-domain resources for sending first detection signals respectively by the n terminal devices are orthogonal to each other.

According to the antenna detection method provided in this implementation, the pilot overheads may be further reduced.

According to a second aspect, embodiments of this application provide an antenna detection method, including: A network device obtains, through a plurality of antenna sub-arrays, a first detection signal sent by an $i^{th}$ terminal device in n terminal devices. The first detection signal is used to determine at least one first antenna sub-array corresponding to the $i^{th}$ terminal device. The plurality of antenna sub-arrays include the at least one first antenna sub-array. A time interval at which the first detection signal is sent is related to spatial non-stationary coherence time. n is an integer greater than or equal to 1, and i is an integer less than or equal to n and greater than or equal to 1. The network device sends first information to the $i^{th}$ terminal device. The first information indicates to perform information transmission through the at least one first antenna sub-array corresponding to the $i^{th}$ terminal device.

In a possible implementation, the time interval at which the first detection signal is sent is shorter than the spatial non-stationary coherence time.

In a possible implementation, the first information includes a matching matrix. The matching matrix indicates at least one first antenna sub-array that is in the plurality of antenna sub-arrays and corresponds to each of the n terminal devices. The matching matrix includes a plurality of matching elements. Each of the plurality of matching elements indicates a degree of matching between an $i^{th}$ terminal device and a second antenna sub-array in the plurality of antenna sub-arrays. The second antenna sub-array is one of the plurality of antenna sub-arrays.

In a possible implementation, the degree of matching is related to signal strength of first detection signal obtained by the second antenna sub-array. The matching element indicates signal strength of the first detection signal obtained by the second antenna sub-array, the matching element indicates a result of comparison between signal strength of the first detection signal obtained by the second antenna sub-array and a first threshold, or the matching element indicates results of comparison between signal strength of the first detection signal obtained by the second antenna sub-array and a plurality of threshold ranges.

In a possible implementation, the matching element indicates the signal strength of the first detection signal obtained by the second antenna sub-array. When the matching element is greater than or equal to a second threshold, the second antenna sub-array is the first antenna sub-array that performs information transmission with the terminal device.

In a possible implementation, when the signal strength of the first detection signal is greater than or equal to the first threshold, the matching element is a first character. The first character indicates that the second antenna sub-array is the first antenna sub-array that performs information transmission with the terminal device. Alternatively, when the signal strength of the first detection signal is less than the first threshold, the matching element is a second character. The second character indicates that the second antenna sub-array is not the first antenna sub-array that performs information transmission with the terminal device.

In a possible implementation, the plurality of threshold ranges one-to-one correspond to a plurality of degrees of matching. The matching element is a character corresponding to a threshold range within which the signal strength of the first detection signal falls. The character corresponding to the threshold range indicates a degree of matching corresponding to the threshold range.

In a possible implementation, the character corresponding to the threshold range is a preset value or is greater than a preset value. The antenna sub-array corresponding to the matching element is the first antenna sub-array that performs information transmission with the terminal device.

In a possible implementation, the first information includes an SRS sequence set. The SRS sequence set is determined based on the at least one first antenna sub-array corresponding separately to the n terminal devices.

In a possible implementation, the method further includes: The network device receives, through the at least one first antenna sub-array corresponding to the $i^{th}$ terminal device in the n terminal devices, a first SRS sequence sent by the terminal device. The first SRS sequence is determined based on the first information.

In a possible implementation, at least time-domain resources, frequency-domain resources, or code-domain resources for sending first detection signals respectively by the n terminal devices are orthogonal to each other.

For beneficial effects of the antenna detection method provided in the second aspect and the possible implementations of the second aspect, refer to the beneficial effects achieved by the first aspect and the possible implementations of the first aspect. Details are not described again.

According to a third aspect, embodiments of this application provide a communication apparatus, including: a transceiver unit, configured to send a first detection signal, where the first detection signal is used to determine at least one first antenna sub-array corresponding to a first terminal device, a plurality of antenna sub-arrays of a network device include the at least one first antenna sub-array, a time interval at which the first detection signal is sent is related to spatial non-stationary coherence time, and the transceiver unit is further configured to obtain first information, where the first information indicates to perform information transmission through the at least one first antenna sub-array corresponding to the first terminal device; and a processing unit, configured to determine the at least one first antenna sub-array based on the first information.

In a possible implementation, the time interval at which the first detection signal is sent is shorter than the spatial non-stationary coherence time.

In a possible implementation, the first information includes a matching matrix. The matching matrix indicates at least one first antenna sub-array that is in the plurality of antenna sub-arrays and corresponds to each of n terminal devices. The n terminal devices include the first terminal device. The matching matrix includes a plurality of matching elements. Each of the plurality of matching elements indicates a degree of matching between an $i^{th}$ terminal device in the n terminal devices and a second antenna sub-array in the plurality of antenna sub-arrays. The second antenna sub-array is one of the plurality of antenna sub-arrays. n is an integer greater than or equal to 1, and i is an integer less than or equal to n and greater than or equal to 1.

In a possible implementation, the degree of matching is related to signal strength of first detection signal obtained by the second antenna sub-array. The matching element indicates signal strength of the first detection signal obtained by the second antenna sub-array, the matching element indicates a result of comparison between signal strength of the first detection signal obtained by the second antenna sub-array and a first threshold, or the matching element indicates results of comparison between signal strength of the first detection signal obtained by the second antenna sub-array and a plurality of threshold ranges.

In a possible implementation, the matching element indicates the signal strength of the first detection signal received by the second antenna sub-array. When the matching element is greater than or equal to a second threshold, the second antenna sub-array is the first antenna sub-array that performs information transmission with the terminal device.

In a possible implementation, when the signal strength of the first detection signal is greater than or equal to the first threshold, the matching element is a first character. The first character indicates that the second antenna sub-array is the first antenna sub-array that performs information transmission with the terminal device. Alternatively, when the signal strength of the first detection signal is less than the first threshold, the matching element is a second character. The second character indicates that the second antenna sub-array is not the first antenna sub-array that performs information transmission with the terminal device.

In a possible implementation, the plurality of threshold ranges one-to-one correspond to a plurality of degrees of matching. The matching element is a character corresponding to a threshold range within which the signal strength of the first detection signal falls. The character corresponding to the threshold range indicates a degree of matching corresponding to the threshold range.

In a possible implementation, the first information includes a channel sounding reference signal SRS sequence set. The SRS sequence set is determined based on the at least one first antenna sub-array corresponding separately to the n terminal devices. The n terminal devices include the first terminal device. n is an integer greater than or equal to 1.

In a possible implementation, the transceiver unit is further configured to send a first SRS sequence to the network device. The first SRS sequence is determined based on the first information.

For beneficial effects of the communication apparatus provided in the third aspect and the possible implementations of the third aspect, refer to the beneficial effects achieved by the first aspect and the possible implementations of the first aspect. Details are not described again.

According to a fourth aspect, embodiments of this application provide a communication apparatus, including: a transceiver unit, configured to obtain, through a plurality of antenna sub-arrays, a first detection signal sent by an $i^{th}$ terminal device in n terminal devices, where the first detection signal is used to determine at least one first antenna sub-array corresponding to the $i^{th}$ terminal device, the plurality of antenna sub-arrays include the at least one first antenna sub-array, and a time interval at which the first detection signal is sent is related to spatial non-stationary coherence time, and n is an integer greater than or equal to 1, and i is an integer less than or equal to n and greater than or equal to 1; and a processing unit, configured to determine first information based on first detection signals sent respectively by the n terminal devices. The first information indicates to perform information transmission through the at least one first antenna sub-array corresponding to the $i^{th}$ terminal device. The transceiver unit is further configured to send the first information to the $i^{th}$ terminal device. The first information indicates to perform information transmission through the at least one first antenna sub-array corresponding to the $i^{th}$ terminal device.

In a possible implementation, the time interval at which the first detection signal is sent is shorter than the spatial non-stationary coherence time.

In a possible implementation, the first information includes a matching matrix. The matching matrix indicates at least one first antenna sub-array that is in the plurality of antenna sub-arrays and corresponds to each of the n terminal devices. The matching matrix includes a plurality of matching elements. Each of the plurality of matching elements indicates a degree of matching between an $i^{th}$ terminal device and a second antenna sub-array in the plurality of antenna sub-arrays. The second antenna sub-array is one of the plurality of antenna sub-arrays.

In a possible implementation, the degree of matching is related to signal strength of first detection signal obtained by the second antenna sub-array. The matching element indicates signal strength of the first detection signal obtained by the second antenna sub-array, the matching element indicates a result of comparison between signal strength of the first detection signal obtained by the second antenna sub-array and a first threshold, or the matching element indicates results of comparison between signal strength of the first detection signal obtained by the second antenna sub-array and a plurality of threshold ranges.

In a possible implementation, the matching element indicates the signal strength of the first detection signal obtained by the second antenna sub-array. When the matching element is greater than or equal to a second threshold, the second antenna sub-array is the first antenna sub-array that performs information transmission with the terminal device.

In a possible implementation, when the signal strength of the first detection signal is greater than or equal to the first threshold, the matching element is a first character. The first character indicates that the second antenna sub-array is the first antenna sub-array that performs information transmission with the terminal device. Alternatively, when the signal strength of the first detection signal is less than the first threshold, the matching element is a second character. The second character indicates that the second antenna sub-array is not the first antenna sub-array that performs information transmission with the terminal device.

In a possible implementation, the plurality of threshold ranges one-to-one correspond to a plurality of degrees of matching. The matching element is a character corresponding to a threshold range within which the signal strength of the first detection signal falls. The character corresponding to the threshold range indicates a degree of matching corresponding to the threshold range.

In a possible implementation, the first information includes an SRS sequence set. The SRS sequence set is determined based on the at least one first antenna sub-array corresponding separately to the n terminal devices.

In a possible implementation, the transceiver unit is further configured to receive, through the at least one first antenna sub-array corresponding to the $i^{th}$ terminal device in the n terminal devices, a first SRS sequence sent by the terminal device. The first SRS sequence is determined based on the first information.

For beneficial effects of the communication apparatus provided in the fourth aspect and the possible implementations of the fourth aspect, refer to the beneficial effects achieved by the first aspect and the possible implementations of the first aspect. Details are not described again.

According to a fifth aspect, embodiments of this application provide an apparatus, including a logic circuit and an input/output interface. The input/output interface is configured to receive a signal from a communication apparatus other than the apparatus and transmit the signal to the logic circuit or send a signal from the logic circuit to a communication apparatus other than the apparatus. The logic circuit is configured to execute code instructions to implement the method according to the first aspect, the second aspect, or the possible implementations.

According to a sixth aspect, embodiments of this application provide a communication device, including a processor and a memory. The memory is configured to store a computer program. The processor is configured to invoke and run the computer program stored in the memory, to perform the methods according to the first aspect, the second aspect, or the possible implementations.

According to a seventh aspect, embodiments of this application provide a chip, including a processor, configured to invoke computer instructions from a memory and run the computer instructions, so that a device on which the chip is mounted performs the method according to the first aspect, the second aspect, or the possible implementations.

According to an eighth aspect, embodiments of this application provide a computer-readable storage medium, configured to store computer program instructions. The computer program enables a computer to perform the method according to the first aspect, the second aspect, or the possible implementations.

According to a ninth aspect, embodiments of this application provide a computer program product, including computer program instructions. The computer program instructions enable a computer to perform the method according to the first aspect, the second aspect, or the possible implementations.

According to a tenth aspect, embodiments of this application provide a terminal, including the communication apparatus according to the third aspect or the possible implementations of the third aspect.

BRIEF DESCRIPTION OF DRAWINGS

FIG. 6 is a schematic flowchart of an example antenna detection method 600 according to an embodiment of this application;

DESCRIPTION OF EMBODIMENTS

The following describes technical solutions of this application with reference to accompanying drawings.

The antenna detection method provided in this application may be applied to various communication systems, for example, a long term evolution (LTE) system, an LTE frequency division duplex (FDD) system, LTE time division duplex (TDD), a universal mobile telecommunication system (UMTS), a worldwide interoperability for microwave access (WiMAX) communication system, a future 5th generation (5G) mobile communication system or a new radio access technology (NR) and three application scenarios of the 5G mobile communication system: enhanced mobile bandwidth (eMBB), ultra-reliable and low-latency communication (uRLLC), and massive machine type communication (mMTC), a device-to-device (D2D) communication system, a satellite communication system, an Internet of things (IOT), a narrow band Internet of things (NB-IOT) system, a global system for mobile communication, (GSM), a system for enhanced data rate for GSM evolution (EDGE), wideband code division multiple access (WCDMA), code division multiple access 2000 (CDMA2000), and a time division-synchronous code division multiple access system (TD-SCDMA). The 5G mobile communication system may be non-standalone (NSA) and/or standalone (SA).

The antenna detection method provided in this application may be further applied to a future communication system, for example, a sixth generation mobile communication system. This is not limited in this application.

Figure 1:
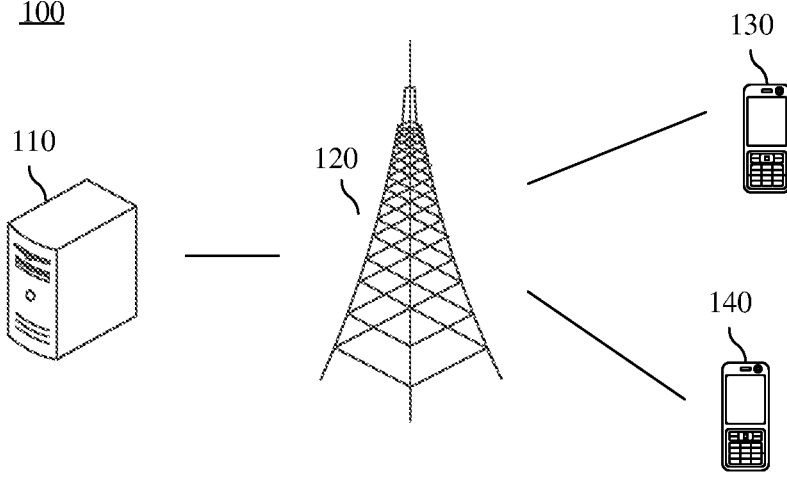
FIG. 1 is a schematic diagram of an architecture of an example communication system to which an embodiment of this application is applied.

FIG. 1 is a schematic diagram of an architecture of an example communication system to which an embodiment of this application is applied. As shown in FIG. 1, the mobile communication system includes a core network device 110, a network device 120, and at least one terminal device (a terminal device 130 and a terminal device 140 in FIG. 1). The terminal device is connected to the network device in a wireless manner. The network device is connected to the core network device in a wireless or wired manner. The core network device and the network device may be independent and different physical devices. Alternatively, functions of the core network device and logical functions of the network device may be integrated into a same physical device, or some functions of the core network device and some functions of the network device may be integrated into one physical device. The terminal device may be fastened or movable. FIG. 1 is only a schematic diagram. The communication system may further include another network device, for example, may further include a wireless relay device and a wireless backhaul device, which are not shown in FIG. 1. Quantities of core network devices, network devices, and terminal devices included in the mobile communication system are not limited in this embodiment of this application.

The network device is an access device through which the terminal device accesses the mobile communication system in a wireless manner, and may be a base station NodeB, an evolved base station eNodeB, a base station in an NR mobile communication system, a base station in a future mobile communication system, an access node in a Wi-Fi system, or the like. A specific technology and a specific device form of the network device are not limited in this embodiment of this application.

The terminal device may be referred to as a terminal, user equipment (UE), a mobile station (MS), a mobile terminal (MT), or the like. The terminal device may be a mobile phone (mobile phone), a tablet computer (pad), a computer with a wireless transceiver function, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

The network device and the terminal device may be deployed on land, including an indoor or outdoor device, and a handheld or vehicle-mounted device. Alternatively, the network device and the terminal device may be deployed on an airplane, a balloon, and a satellite in the air. Application scenarios of the network device and the terminal device are not limited in this embodiment.

Communication between the network device and the terminal device, and communication between terminal devices may be performed over a licensed spectrum, an unlicensed spectrum, or both the licensed spectrum and the unlicensed spectrum. Communication between the network device and the terminal device, and communication between the terminal devices may be performed over a spectrum below 6G Hz, a spectrum above 6G Hz, or both the spectrum below 6G Hz. and the spectrum above 6G Hz. Spectrum resources used for communication between the network device and the terminal device are not limited in this embodiment.

It should be understood that specific forms of the network device and the terminal device are not limited in this application.

Figure 2:
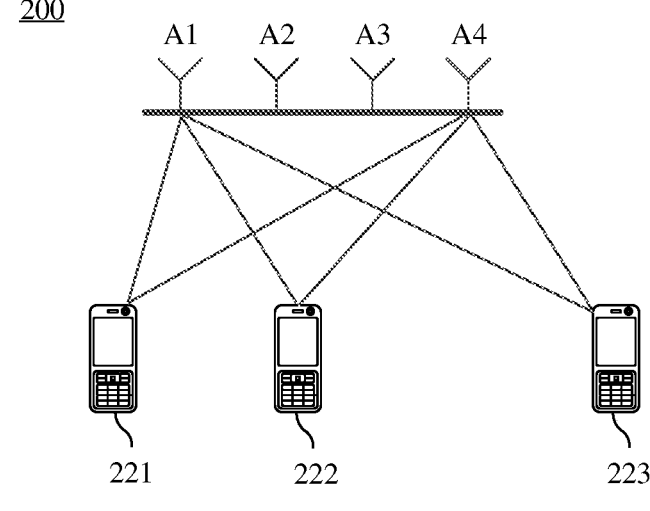
FIG. 2 is a schematic diagram of an example scenario 200 of a MIMO array according to an embodiment of this application.

In a multiple-input multiple-output (MIMO) scenario, a network device (for example, the network device 120 in FIG. 1) and a terminal device, (the terminal device 130 and/or the terminal device 140 in FIG. 1) perform information transmission through a plurality of antennas, and an antenna system including a plurality of channels is formed between a transmitter and a receiver. FIG. 2 is a schematic diagram of an example scenario 200 of a MIMO array according to an embodiment of this application. Refer to FIG. 2. A network device 210 performs uplink or downlink information transmission with a terminal device 221, a terminal device 222, and a terminal device 223 through a plurality of antennas (A1 to A4). For example, the network device 210 receives, through the antennas (A1 to A4), uplink information sent by at least one of the terminal device 221, the terminal device 222, and the terminal device 223. Alternatively, the network device 210 sends, through the antennas (A1 to A4), the downlink information to at least one of the terminal device 221, the terminal device 222, and the terminal device 223. In a procedure in which the terminal device 221, the terminal device 222, and the terminal device 223 separately perform information transmission with the network device 210, the terminal device 221, the terminal device 222, or the terminal device 223 may perform information transmission with the network device 210 through one or more antennas of the terminal device 221, the terminal device 222, or the terminal device 223. This is not shown in the figure.

In the foregoing MIMO scenario, the network device and the terminal device need to process a signal based on a baseband signal of a full-array antenna. An existing spectrum resource is fully utilized, and a space resource is utilized to obtain gains in reliability and effectiveness. Consequently, it is more complex for the network device and the terminal device to process the signals, and efficiency of information communication is reduced.

However, in an enhanced mobile broadband (eMBB) scenario, according to the massive antenna (massive MIMO) technology, or referred to as an extremely large aperture array (ELAA), there is a larger quantity of antennas and a larger antenna (equivalent) aperture, to further improve a system capacity and spectral efficiency of the communication system. Therefore, in the massive MIMO scenario, baseband signal processing is more complex, and information communication efficiency is affected.

Figure 3A:
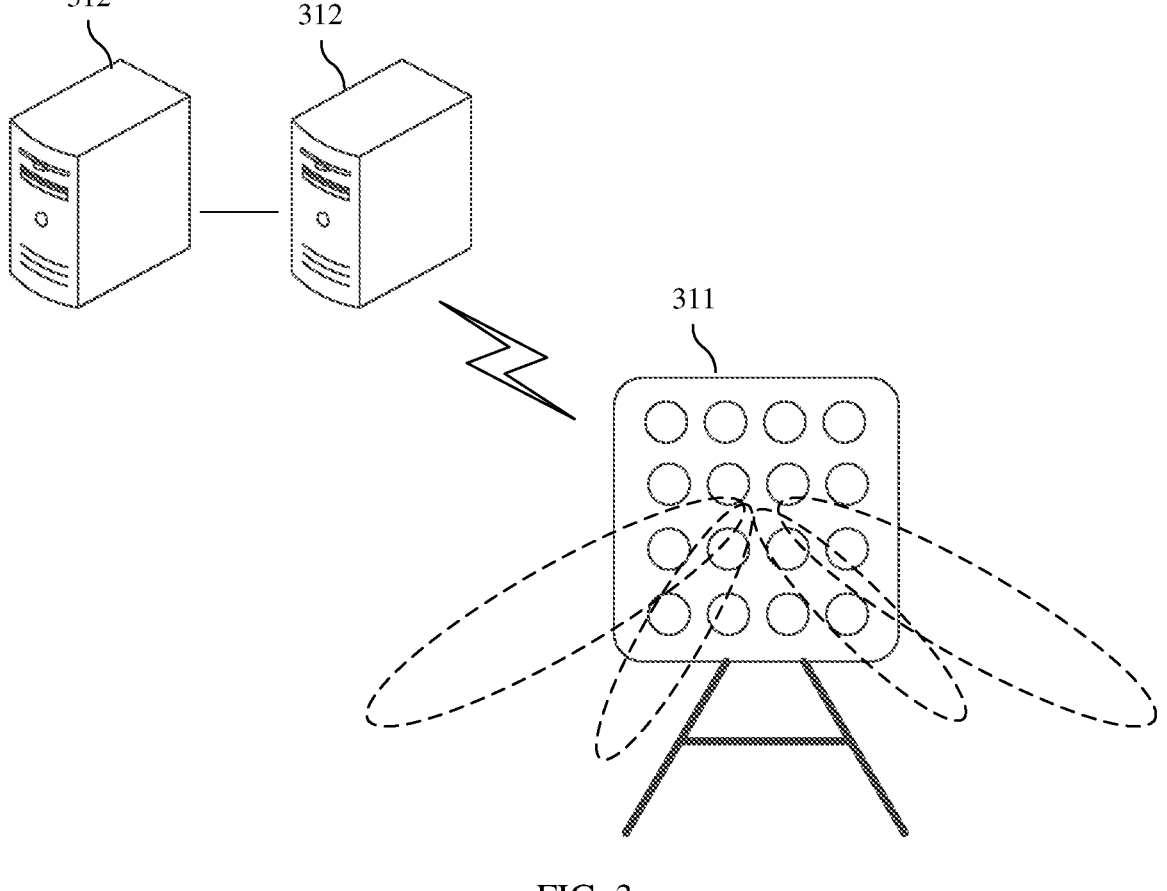
FIG. 3a is a schematic diagram of an example full-array antenna according to an embodiment of this application.
Figure 3B:
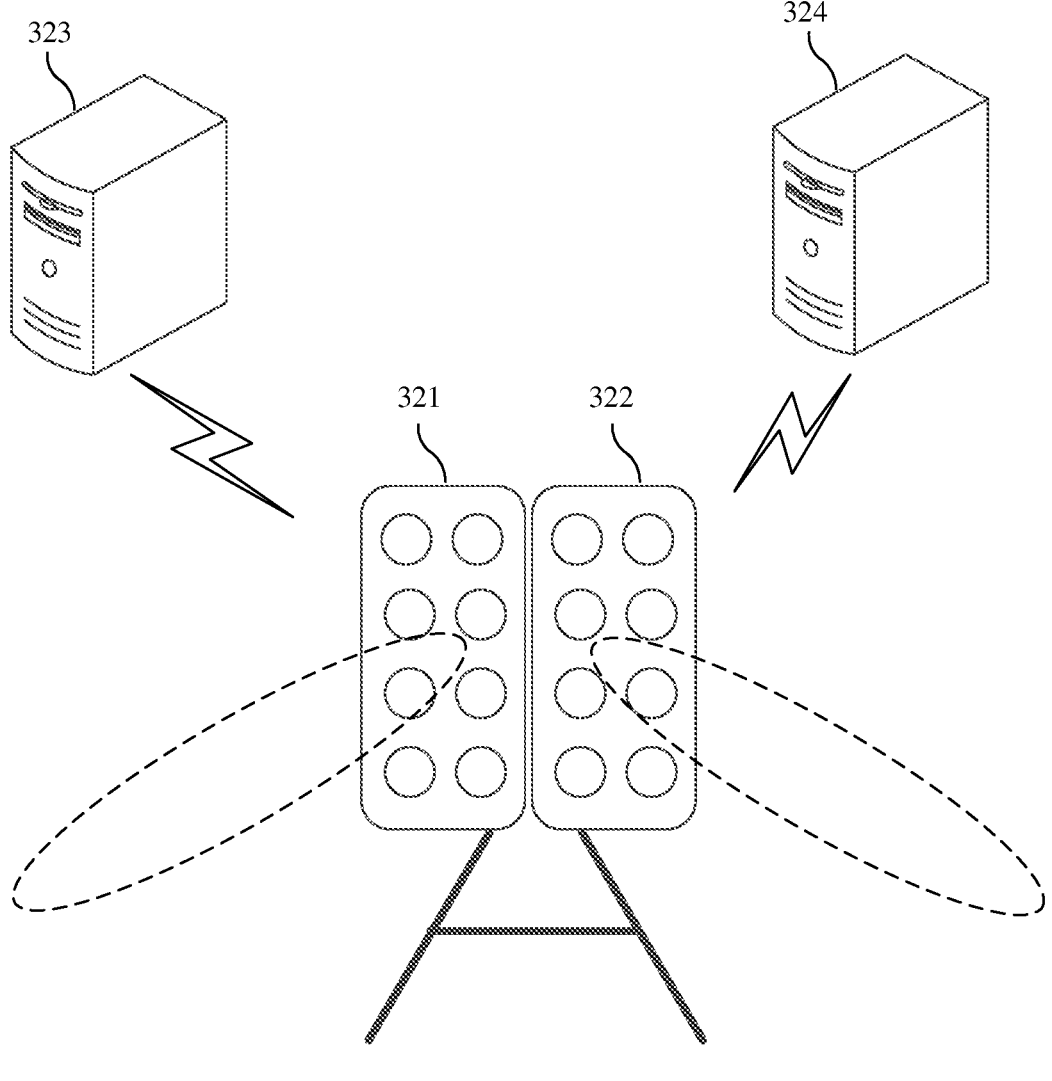
FIG. 3b is a schematic diagram of example antenna splitting according to an embodiment of this application.

Currently, the following antenna "splitting" manner may make baseband signal processing less complex, as shown in FIG. 3*a* and FIG. 3*b*.

FIG. 3*a* is a schematic diagram of an example full-array antenna according to an embodiment of this application. FIG. 3*b* is a schematic diagram of example antenna splitting according to an embodiment of this application. As shown in FIG. 3*a*, a full-array antenna 311 is connected to one baseband processing unit or a group of baseband processing units (BBU) 312. When an array area of the full-array antenna is excessively large, to make baseband signal processing less complex, the full-array antenna may be "split". This splitting manner is static division of antenna ports. In other words, the full-array antenna is divided into two or more antenna arrays. Refer to FIG. 3*b*. Antenna arrays 321 and 322 obtained through splitting are respectively connected to a BBU 323 and a BBU 324. This makes baseband signal processing less complex, but reduces space-division multiplexing freedom (that is, a channel capacity) of MIMO. In addition, in a dynamic scenario in which a terminal device moves, an optimal antenna or antenna sub-array cannot be used to serve a terminal user.

It can be learned that currently, there is no any effective solution for making baseband signal processing less complex in a MIMO scenario or a massive MIMO scenario.

For ease of understanding embodiments of this application, the following first describes coherence time in embodiments of this application.

1. Coherence Time of a Radio Channel

One of the characteristics of a radio channel is fading. In other words, the radio channel exhibit rapid changes in time and frequency. The channel coherence time is a measure of a rate at which the channel changes over time. Within the channel coherence time, two arrival signals are strongly correlated in amplitude. In a wireless communication system, if the channel coherence time is shorter than a cycle in which a signal is sent, the arrival signal may be distorted due to a fast-fading procedure (or referred to as time-selective fading). Therefore, to ensure accuracy of channel measurement, generally, a time interval at which an SRS is sent is shorter than or equal to channel coherence time. For example, different measurement cycles (2 ms to 200 ms) are set for an uplink SRS signal in 5G. The channel coherence time varies as a moving speed of a terminal device changes. A network device instructs, based on the channel coherence time, the terminal device to send the SRS signal at different frequencies.

2. Spatial Non-Stationary Coherence Time

Spatial non-stationarity is an important characteristic of propagation over a channel of MIMO, especially massive MIMO (for example, massive MIMO and ELAA). As a physical size of an antenna increases, channel parameters, such as signal energy, a delay, angular spread, a scattering center, and other large-scale characteristics, vary significantly in different antennas in a same array. Another phenomenon reflected by the size increase is that energy of signals received by terminal devices at different geographical locations comes from only some antennas instead of all antennas. A part of the antenna that is "seen" by the terminal is referred to as a "visible region". The spatial non-stationary coherence time is a measure of a change rate of a relationship of matching between a terminal device and an antenna. A spatial non-stationary characteristic is stable in the spatial non-stationary coherence time. It may be understood that in the spatial non-stationary coherence time, for the terminal device, antennas in the "visible region" are the same or have a degree of similarity greater than a preset value. Because the spatial non-stationarity is caused by the large-scale characteristics of the channel, a change speed of the spatial non-stationarity is generally much slower than a change speed of fast-fading of the channel.

Figure 4:
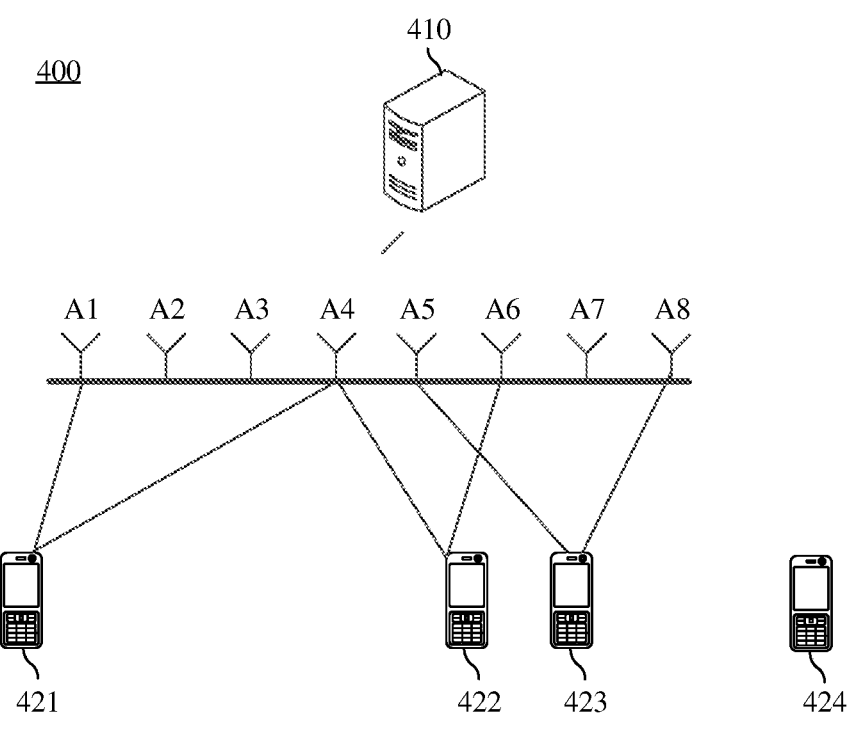
FIG. 4 is a schematic diagram of an example scenario 400 of a centralized ELAA according to an embodiment of this application.
Figure 5:
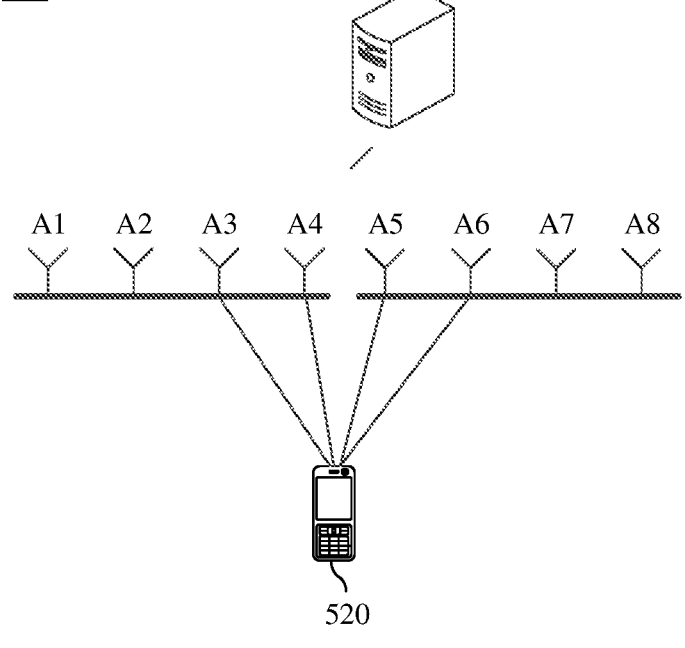
FIG. 5 is a schematic diagram of an example scenario 500 of a distributed ELAA according to an embodiment of this application.

A massive MIMO scenario is used as an example. There is a large quantity of antennas in the network device. Relative locations between the antennas and the terminal device are different. Parameters and statistical characteristics (such as multipath angles of arrival and channel gains) of channels between the antennas at different locations and the terminal device also change significantly. This phenomenon is referred to as a "spatial non-stationary" characteristic of a radio channel. In an actual interaction procedure, the "spatial non-stationary" characteristic between a plurality of antennas of the network device and each terminal device may be reflected as follows: Only some antennas or arrays of the network device are needed for serving a terminal device. However, antennas, sub-arrays, or combinations of sub-arrays that provide services for different terminal devices may be different. Refer to FIG. 4 and FIG. 5. FIG. 4 is a schematic diagram of an example scenario 400 of a centralized ELAA according to this application. Fight antennas A1 to A8 are deployed in a network device 410. Good transmission is achieved between the antennas A1 to A4 of the network device 410 and a terminal device 421. Good transmission is achieved between the antennas A4 to A6 and a terminal device 422. Good transmission is achieved between the antenna A5 to A8 and a terminal device 423. FIG. 5 is a schematic diagram of an example scenario 500 of a distributed ELAA according to this application. Four antennas A1 to A4 distributed at a location a and four antennas A5 to A8 distributed at a location b are deployed in a network device 510. Good transmission is achieved between the antennas A3 to A6 of the network device 510 and a terminal device 520.

The antennas shown in FIG. 4 and FIG. 5 may alternatively be antenna sub-arrays, and each antenna sub-array may include one or more antennas.

Based on the foregoing analysis, in this application, at least one antenna/antenna sub-array that is in the plurality of antennas/antenna sub-arrays of the network device and corresponds to each terminal device is determined based on the spatial non-stationary characteristic of the radio channel. In this way, the network device performs information transmission with the terminal device through the at least one antenna/antenna sub-array corresponding to the terminal device. In this way, it is less complex for the network device and/or the terminal device to process a baseband signal, and information communication efficiency is improved.

In a possible implementation solution, antenna detection may be performed by using a sounding reference signal (SRS). It should be noted that the SRS is usually used to measure quality of an uplink channel between a terminal device and a network device. Generally, the SRS is sent within channel coherence time of an uplink transmission channel, and measurement performed by using the SRS is performed on a large bandwidth, to measure channel state information (CSI) about channels from a terminal to all receiving antennas on a base station array. The information is used for uplink transmission resource allocation. In the case of a TDD system, the information is also used to optimize a downlink transmission policy (for example, precoding). Therefore, an SRS cycle is short and occupies a large bandwidth.

This application provides an antenna detection solution. A first detection signal is introduced. Detection is performed on a plurality of antennas/antenna sub-arrays of a network device, to obtain an antenna/antenna sub-array for information transmission with each terminal device. A time interval at which the first detection signal is sent is related to spatial non-stationary coherence time, and is not limited by coherence time of an uplink transmission channel. In other words, a cycle in which the first detection signal is sent does not need to be the same as a cycle in which an SRS is sent. In this way, an antenna detection cycle is more flexible and controllable.

Further, the spatial non-stationary coherence time is longer than the coherence time of the uplink transmission channel. Generally, the time interval at which the first detection signal is sent is longer than a time interval at which the SRS is sent. Therefore, in embodiments of this application, antenna detection is performed based on the first detection signal, to further reduce pilot overheads, and improve information communication efficiency.

For ease of understanding embodiments of this application, the following several descriptions are provided.

First, the terms "first", "second", and various numbers in the following embodiments are merely used for differentiation for ease of description, and are not used to limit the scope of embodiments of this application, for example, distinguishing different detection signals, antennas/antenna sub-arrays, thresholds, and values.

Second, the "protocol" in embodiments of this application, may refer to a standard protocol in the field of communication, for example, including an LTE protocol, an NR protocol, and a related protocol applied to a future communication system. This is not limited in this application.

Third, in embodiments of this application, descriptions such as "when", "in a case", and "if" mean that a device (for example, a terminal device or a network device) performs corresponding processing in an objective situation, and are not intended to limit time, and the device (for example, the terminal device or the network device) is not required to perform a determining action during implementation; and do not mean any other limitation.

Fourth, "at least one" means one or more, and "a plurality of" means two or more. The term "and/or" describes an association relationship between associated objects, and represents that three relationships may exist. For example, A and/or B may represent any one of the following cases: Only A exists, both A and B exist, or only B exists, where A and B may be singular or plural. The character "/" generally indicates an "or" relationship between the associated objects.

Fifth, in embodiments of this application, that a first terminal device determines a first SRS sequence may also be represented as that a first terminal device selects a first SRS sequence. In the following description, "select" and "determine" are alternately used, and their meanings are the same or similar.

The following describes an antenna detection method in embodiments of this application with reference to the accompanying drawings.

It should be understood that for ease of understanding and description, the following describes the method provided in embodiments of this application by mainly using interaction between a network device and a first terminal device as an example. The first terminal device may be any one of n terminal devices that exchange information with the network device, and n is an integer greater than or equal to 1. The first terminal device may be, for example, the terminal device 130 or the terminal device 140 in the communication system shown in FIG. 1, and the network device may be the network device 120 in the communication system shown in FIG. 1. The first terminal device may alternatively be, for example, one of the terminal devices 221 to 223 in FIG. 2, and the network device may be the network device 210 in the communication system shown in FIG. 2. The first terminal device may alternatively be, for example, one of the terminal devices 421 to 423 in FIG. 4, and the network device may be the network device 410 in the communication system shown in FIG. 4. The first terminal device may be, for example, the terminal device 520 in the communication system shown in FIG. 5, and the network device may be the network device 510 in the communication system shown in FIG. 5.

However, it should be understood that this should not constitute any limitation on an execution body of the method provided in this application. Any device that can run code of the method provided in embodiments of this application to perform the method provided in embodiments of this application may be used as an execution body of the method provided in embodiments of this application. For example, the terminal device shown in the following embodiments may also be replaced with a component in the terminal device, for example, a chip, a chip system, or another functional module that can invoke a program and execute the program. The network device may also be replaced with a component in the network device, for example, a chip, a chip system, or another functional module that can invoke a program and execute the program.

In addition, for ease of understanding and description, the following uses an example in which an antenna sub-array is used as antenna division granularity to describe a specific procedure of an embodiment. However, it should be understood that antenna division granularity is not limited in this embodiment. For example, using an antenna as antenna division granularity also falls within the protection scope of this application.

FIG. 6 is a schematic flowchart of an example antenna detection method 600 according to an embodiment of this application. As shown in FIG. 6, the method 600 may include S610 and S620. The following describes steps in the method 600.

S610: A first terminal device sends a first detection signal to a network device, where the first detection signal is used to determine at least one first antenna sub-array corresponding to the first terminal device, a plurality of antenna sub-arrays of the network device include the at least one first antenna sub-array, and a time interval at which the first detection signal is sent is related to spatial non-stationary coherence time.

Correspondingly, the network device obtains, through the plurality of antenna sub-arrays, the first detection signal sent by the first terminal device in n terminal devices. The first terminal device is any one of the n terminal devices, and may alternatively be represented as an $i^{th}$ terminal device. n is an integer greater than or equal to 1, and i is an integer less than or equal to n and greater than or equal to 1.

S620: The network device sends first information to the first terminal device, where the first information indicates to perform information transmission through the at least one first antenna sub-array corresponding to the first terminal device.

Correspondingly, the first terminal device obtains the first information from the network device. The first information indicates to perform information transmission through the at least one first antenna sub-array corresponding to the first terminal device.

In S610, each of the n terminal devices including the first terminal device sends the first detection signal to the network device, and the network device receives the first detection signal sent by each of the terminal devices including the first terminal device.

It should be noted that the first detection signal is a signal that is provided in this application and that may be used for antenna detection, and is different from an SRS signal. A difference between the first detection signal and the SRS signal is described in detail below. The first detection signal may be, for example, an antenna probing reference signal (APRS). It should be understood that the APRS is a possible functional description of the first detection signal in this application, but does not constitute any limitation on this application. For example, the first detection signal may further include another function, and a corresponding functional description may be used.

It may be understood that first detection signals sent by the n terminal devices may be different. For example, the first detection signals sent by the terminal devices have different sequences. However, it should be understood that the first detection signals sent by the terminal devices may be applied to embodiments of this application, to implement the antenna detection method provided in embodiments of this application.

Interaction between the first terminal device and the network device is used as an example. The network device may separately obtain, through the plurality of antenna sub-arrays deployed on the network device, the first detection signal sent by the first terminal device. The network device may determine, based on the first detection signal received through each antenna sub-array, at least one first antenna sub-array that is in the plurality of antenna sub-arrays and corresponds to the first terminal device.

In some embodiments, that the network device obtains the first detection signal sent by the first terminal device in n terminal devices may be specifically that the network device receives the first detection signal sent by the first terminal device in the n terminal devices. It should be noted that, in this embodiment, a procedure in which the network device obtains the first detection signal may include an implementation in which the network device receives the first detection signal.

As described above, a change in a relative location between each terminal device and the network device causes a change in spatial non-stationarity. In other words, when a relative location between any terminal device and the network device changes, at least one first antenna sub-array corresponding to the terminal device may also be different. The spatial non-stationary coherence time may reflect a change rate of the spatial non-stationarity. In other words, a spatial non-stationary characteristic is stable in the spatial non-stationary coherence time. The first detection signal is sent within the spatial non-stationary coherence time, and the at least one first antenna corresponding to any terminal device may be accurately obtained through detection. In other words, the time interval at which the first detection signal is sent is related to the spatial non-stationary coherence time.

Optionally, the time interval at which the first detection signal is sent is a difference between two values of the spatial non-stationary coherence time or a multiple of the spatial non-stationary coherence time.

Optionally, the time interval at which the first detection signal is sent is shorter than or equal to the spatial non-stationary coherence time. Antenna detection is performed within the spatial non-stationary coherence time, so that the at least one first antenna sub-array currently corresponding to the first terminal device may be obtained in time. However, if the time interval at which the first detection signal is sent is longer than the spatial non-stationary coherence time, it indicates that a transmission frequency of the first detection signal is lower than the change rate of the spatial non-stationarity, and when the at least one first antenna sub-array corresponding to the first terminal device changes, at least one changed first antenna sub-array cannot be learned in time.

It may be understood that the spatial non-stationary coherence time is usually different from channel coherence time (for example, the channel coherence time for uplink transmission). Generally, the spatial non-stationary coherence time is longer than the channel coherence time.

In S610, that a time interval at which the first detection signal is sent is related to spatial non-stationary coherence time means that the time interval is not constrained by the channel coherence time (for example, the channel coherence time for uplink transmission). When antenna detection is performed based on the first detection signal, the first detection signal may be sent at a more flexible time interval.

Figure 7:
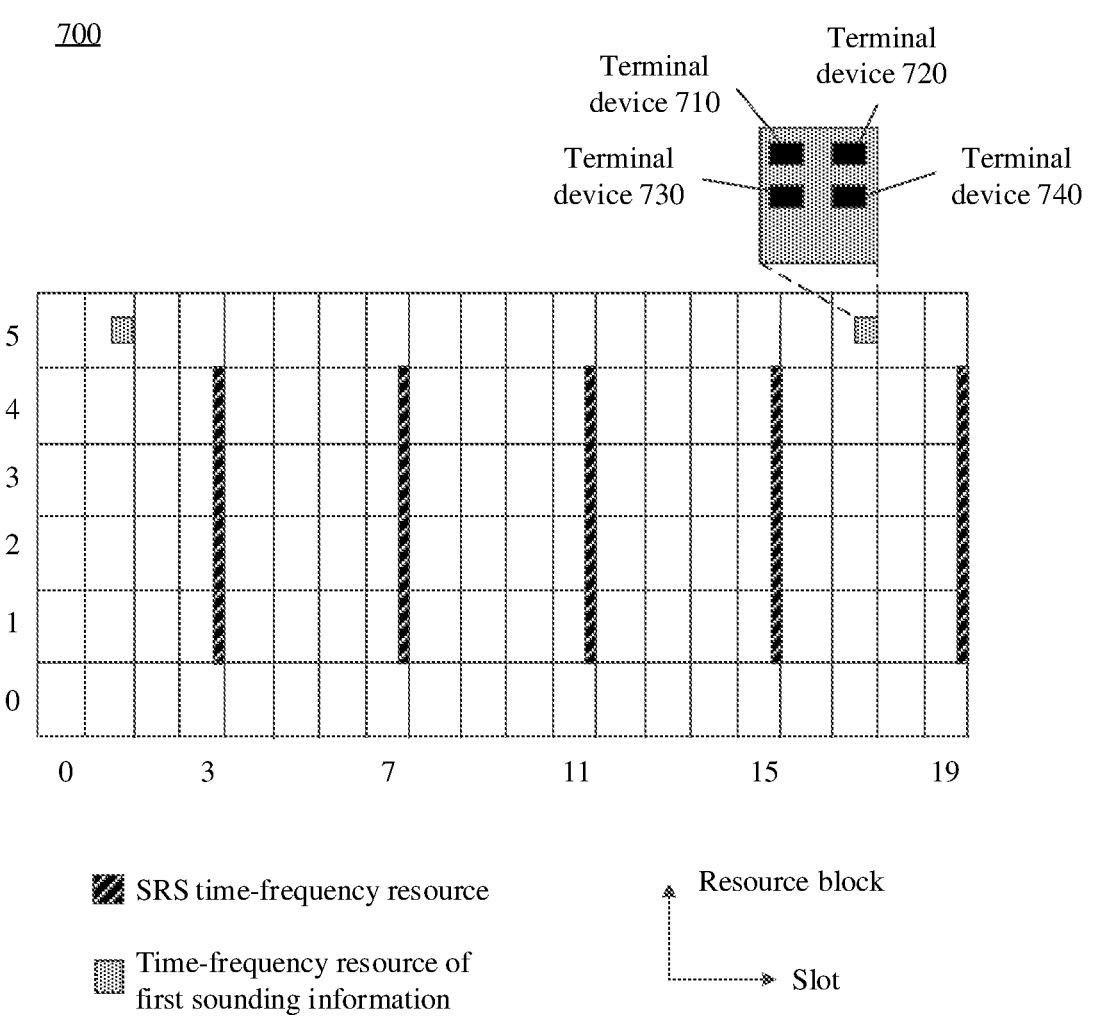
FIG. 7 is a schematic diagram of an example time interval 700 at which pilot information is sent according to an embodiment of this application.

FIG. 7 is a schematic diagram of an example time interval 700 at which pilot information is sent according to an embodiment of this application.

As described above, the time interval at which the SRS is sent may also be referred to as an SRS cycle, and should be shorter than the channel coherence time. For example, as shown in FIG. 7, the time interval at which the SRS is sent is four slots (or 4 ms). The time interval at which the first detection signal is sent may also be referred to as a cycle of the first detection signal, and is not constrained by channel coherence time. Therefore, to reduce pilot overheads, the time interval at which the first detection signal is sent may be longer than the time interval at which the SRS is sent. For example, as shown in FIG. 7, the time interval at which the first detection signal is sent is 16 slots (or 16 ms).

In some implementations, to further reduce pilot overheads, at least time-domain resources, frequency-domain resources, or code-domain resources for sending n first detection signals respectively by the n terminal devices are orthogonal to each other. For example, as shown in FIG. 7, a terminal device 710 and a terminal device 720 send first detection signal by reusing a frequency-domain resource and using different time-domain resources. Similarly, a terminal device 730 and a terminal device 740 send first detection signal by reusing a frequency domain resource and using different time-domain resources. The terminal device 710 and the terminal device 730 send first detection signal on a same time-domain resource, but the first detection signal sent by the terminal device 710 is orthogonal to the first detection signal sent by the terminal device 730 in frequency domain. Similarly, the terminal device 720 and the terminal device 740 send first detection signal on a same time-domain resource, but the first detection signal sent by the terminal device 720 is orthogonal to the first detection signal sent by the terminal device 740 in frequency domain. In view of this, in the embodiment shown in FIG. 7, terminal devices 710 to 740 may use a sequence with good orthogonal performance, for example, a (Zadoff-Chu) sequence.

In some embodiments, before the first terminal device sends the first detection signal to the network device, the network device may allocate resources for the first detection signal. For example, the network device sends configuration information (for example, radio resource control (RRC) signaling) to the first terminal device. The first terminal device determines a transmission resource of the first detection signal based on the configuration information, and sends the first detection signal on the transmission resource.

In S620, the first information may be signaling independently transmitted and/or received or may be transmitted and/or received via other signaling. For example, a channel carrying the first information may be a physical downlink control channel (PDCCH) and/or a physical downlink shared channel (PDSCH) for transmission. Alternatively, the channel may carry downlink control information (DCI) or the like.

In some embodiments, the first information sent by the network device to the first terminal device in S620 may include a matching matrix or an SRS sequence set. It may be understood that the matching matrix indicates at least one first antenna sub-array that is in the plurality of antenna sub-arrays of the network device and corresponds to each of the n terminal devices. Optionally, when the first information includes the matching matrix, both the network device and the first terminal device may determine, based on the matching matrix, the at least one first antenna sub-array through which the network device performs information transmission with the first terminal device, and perform information transmission through the at least one first antenna sub-array, for example, transmit and/or receive pilot information (for example, an SRS). When the first information includes the SRS sequence set, the terminal device may directly determine, from the SRS sequence set, a first SRS sequence for channel detection, and the network device may receive the first SRS sequence through the at least one first antenna sub-array.

Optionally, the network device may send the first information to the first terminal device through the at least one first antenna sub-array.

The following first uses an example to describe the matching matrix included in the first information.

The matching matrix includes a plurality of matching elements. The matching element indicates a degree of matching between an $i^{th}$ terminal device in the n terminal devices and one of the plurality of antenna sub-arrays, n is an integer greater than or equal to 1, and i is an integer less than or equal to n and greater than or equal to 1.

In some embodiments, the degree of matching is related to signal strength of first detection signal sent by the $i^{th}$ terminal device For example, higher signal strength of the first detection signal obtained by the network device through a second antenna sub-array indicates a higher degree of matching between the second antenna sub-array and the $i^{th}$ terminal device. The second antenna sub-array is any one of the plurality of antenna sub-arrays of the network device.

The signal strength of the first detection signal is an energy amplitude of a channel impulse response (CIR) between the second antenna sub-array and the $i^{th}$ terminal device.

For example, $y_{ij}$ in signal strength $|y_{ij}|^2$ of the first detection signal $x_i$ that is of the $i^{th}$ terminal device $UE_i$ and that is received by the second antenna sub-array $y_j$ meets the following formula 1:

$$y_0 = h_{ij} x_i + n_{ij} \tag{1}$$

$h_{ij}$ is a channel between the $i^{th}$ terminal device $UE_i$ and the second antenna sub-array $y_j$, and $n_{ij}$ is noise.

In this embodiment, the first information may include but is not limited to the following three possible implementations.

Implementation 1: The matching element in the matching matrix indicates signal strength of the first detection signal obtained by the second antenna sub-array.

For example, the signal strength $|y_{ij}|^2$ of the first detection signal $x_i$ that is of the $i^{th}$ terminal device UE; and that is received by the second antenna sub-array $y_j$ is determined according to the foregoing formula 1, and the signal strength $|y_{ij}|^2$ is used as a value of the matching element.

FIG. 4 is used as an example. The following table 1 may show a matrix of matching formed between the terminal devices 421 to 424 and the antenna sub-arrays A1 to A8. A unit of each matching element in table 1 may be "dB".

TABLE 1

|  | A1 | A2 | A3 | A4 | A5 | A6 | A7 | A8 |
|---|---|---|---|---|---|---|---|---|
| UE 421 | 55 | 58 | 54 | 53 | 42 | 30 | 5 | 0 |
| UE 422 | 1 | 11 | 33 | 51 | 55 | 54 | 30 | 15 |
| UE 423 | 0 | 1 | 15 | 42 | 52 | 52 | 56 | 53 |
| UE 424 | 0 | 0 | 0 | 0 | 0 | 1 | 10 | 31 |

For example, the network device and each terminal device may determine, based on the matching matrix and a second threshold, the at least one first antenna sub-array corresponding to the $i^{th}$ terminal device. For example, a second antenna sub-array corresponding to a matching element that is in the matching matrix and that is greater than the second threshold is determined as the first antenna sub-array corresponding to the terminal device corresponding to the matching element.

It should be noted that a procedure in which the network device determines the at least one first antenna sub-array corresponding to the $i^{th}$ terminal device may be performed before or after the first information is sent. This is not limited in this application. A difference lies in that when the procedure in which the network device determines the at least one first antenna sub-array corresponding to the $i^{th}$ terminal device is performed before the first information is sent, the first information may be sent to the $i^{th}$ terminal device through the at least one first antenna sub-array. A procedure in which the $i^{th}$ terminal device determines at least one first antenna sub-array corresponding to the $i^{th}$ terminal device and/or another terminal device is performed after the first information is received.

For example, the network device or the $i^{th}$ terminal device may determine, based on a result of comparison between each matching element and the second threshold, whether the second antenna sub-array corresponding to the matching element is the first antenna sub-array that matches the $i^{th}$ terminal device. It is assumed that the second threshold is 50 dB. The network device or the UE 421 may determine that the antenna sub-arrays A1 to A4 are the first antenna sub-arrays, and A5 to A8 are not the first antenna sub-arrays.

It should be noted that the $i^{th}$ terminal device may further determine, based on the matching matrix and the second threshold, at least one first antenna sub-array corresponding to another terminal device. For example, the UF 421 may determine that the antenna sub-arrays A4 to A6 are at least one first antenna sub-array corresponding to the UE 422.

In the implementation 1, according to the degrees of matching indicated by the matching matrix, it is possible that a degree of matching between a terminal device and any second antenna sub-array is less than the second threshold. In other words, the network device does not have a first antenna sub-array corresponding to the terminal device. As shown in table 1, the UE 424 does not have a corresponding first antenna sub-array.

The second threshold may be identified by using a specific character, and the character may be a value, a letter, a symbol, or the like. The character may be predefined, for example, defined based on a protocol, or may be preconfigured by the network device. This is not limited in embodiments of this application.

Optionally, the second threshold is configured by using signaling. For example, the network device may configure the second threshold by using signaling. The first terminal device may locally prestore the second threshold based on the received signaling.

In the implementation 1, the degree of matching, indicated by the matching element in the matching matrix, between the $i^{th}$ terminal device and the second antenna sub-array is more accurate. The first terminal device and/or the network device may further compare the matching element with the second threshold to determine the at least one first antenna sub-array corresponding to the $i^{th}$ terminal device.

In an implementation 2, the matching element indicates a result of comparison between signal strength of the first detection signal obtained by the second antenna sub-array and a first threshold.

For example, signal strength $|y_{ij}|^2$ of the first detection signal $x_i$ that is of the $i^{th}$ terminal device $UE_i$ and that is received by a second antenna sub-array $A_j$ of the network device 410 in FIG. 4 is determined based on the foregoing formula 1. The result of comparison between the signal strength $|y_{ij}|^2$ and the first threshold is used as a value of the matching element.

For example, for a matching element, when the signal strength of the first detection signal is greater than or equal to the first threshold, the matching element is a first character. The first character indicates that the second antenna sub-array is the first antenna sub-array that performs information transmission with the terminal device. Alternatively, when the signal strength of the first detection signal is less than the first threshold, the matching element is a second character. The second character indicates that the second antenna sub-array is not the first antenna sub-array that performs information transmission with the terminal device.

For example, the first character is 1 and the second character is 0, as shown in table 2.

TABLE 2

|  | A1 | A2 | A3 | A4 | A5 | A6 | A7 | A8 |
|---|---|---|---|---|---|---|---|---|
| UE 421 | 1 | 1 | 1 | 1 | 0 | 0 | 0 | 0 |
| UE 422 | 0 | 0 | 0 | 1 | 1 | 1 | 0 | 0 |
| UE 423 | 0 | 0 | 0 | 0 | 1 | 1 | 1 | 1 |
| UE 424 | 0 | 0 | 0 | 0 | 0 | 0 | 0 | 0 |

Both the network device and each terminal device may determine, based on the character of the matching element in the matching matrix, the at least one first antenna sub-array corresponding to the $i^{th}$ terminal device.

The first threshold may be identified by using a specific character, and the character may be a value, a letter, a symbol, or the like. The character may be predefined, for example, defined based on a protocol, or may be preconfigured by the network device. This is not limited in embodiments of this application.

Optionally, the first threshold is configured by using signaling. For example, the network device may configure the first threshold by using signaling. The first terminal device may locally prestore the first threshold based on the received signaling.

Optionally, the first threshold may be the same as or different from the second threshold.

In the implementation 2, according to the degrees of matching indicated by the matching matrix, it is possible that a terminal device does not match any second antenna sub-array. In other words, the network device does not have a first antenna sub-array corresponding to the terminal device. As shown in table 1, the UE 424 does not have a corresponding first antenna sub-array.

In the implementation 2, the matching element in the matching matrix may explicitly indicate whether the second antenna sub-array is the first antenna sub-array corresponding to the $i^{th}$ terminal device. Both the network device and the id terminal device may quickly identify, based on the matching matrix, at least one first antenna sub-array corresponding to each terminal device. In an implementation 3, the matching element indicates results of comparison between signal strength of the first detection signal obtained by the second antenna sub-array and a plurality of threshold ranges.

For example, signal strength $|y_{ij}|^2$ of the first detection signal $x_i$ that is of the $i^{th}$ terminal device UE; and that is received by a second antenna sub-array $A_j$ of the network device 410 in FIG. 4 is determined based on the foregoing formula 1. The results of comparison between the signal strength $|y_{ij}|^2$ and the plurality of threshold ranges are used as values of a matching element.

In the implementation 3, the plurality of threshold ranges one-to-one correspond to a plurality of degrees of matching. In other words, one threshold range corresponds to one degree of matching, and one threshold range corresponds to one character or character string. The character corresponding to the threshold range indicates a degree of matching corresponding to the threshold range. For example, for a matching element, the matching element is a character corresponding to a threshold range within which the signal strength of the first detection signal that is sent by the $i^{th}$ terminal device and that is obtained by a second antenna sub-array falls.

It should be noted that the plurality of threshold ranges may be obtained by dividing a plurality of thresholds. For example, a first threshold range is $(-\infty, R1)$, a second threshold range is $[R2, R3)$, and a third threshold range is $[R3, \infty)$. R1, R2, and R3 are the plurality of different thresholds, and R1<R2<R3.

The threshold ranges may correspond to different characters. The characters are not specifically limited in this embodiment. For example, the character may be a letter, a symbol, a value, or the like. For example, the first threshold range may correspond to a character 0, the second threshold range may correspond to a character 1, and the third threshold range may correspond to a character 2.

It may be understood that when the plurality of threshold ranges in the implementation 3 are two threshold ranges obtained by dividing the first threshold, the foregoing implementation 2 may be an implementation of the implementation 3.

For example, as shown in FIG. 4, the plurality of threshold ranges include the first threshold range, the second threshold range, and the third threshold range, and a matching matrix may be as shown in the following table 3.

TABLE 3

|        | A1 | A2 | A3 | A4 | A5 | A6 | A7 | A8 |
|--------|----|----|----|----|----|----|----|----|
| UE 421 | 2  | 2  | 1  | 1  | 0  | 0  | 0  | 0  |
| UE 422 | 0  | 0  | 0  | 1  | 2  | 1  | 0  | 0  |
| UE 423 | 0  | 0  | 0  | 0  | 1  | 1  | 2  | 1  |
| UE 424 | 0  | 0  | 0  | 0  | 0  | 0  | 0  | 0  |

For example, the network device and the terminal device may determine, based on the matching matrix provided in the implementation 3, at least one first antenna sub-array corresponding to each terminal device. For example, the network device and the terminal device determine, according to whether a matching element is a preset value or is greater than or equal to a preset value, whether a second antenna sub-array corresponding to the matching element is the first antenna sub-array corresponding to the $i^{th}$ terminal device. Refer to table 3. It is assumed that a preset value is 1 or 2, or a preset value is 1. A1 to A4 are at least one first antenna sub-array corresponding to the UE 421, A4 to A6 are at least one first antenna sub-array corresponding to the UE 422, and A5 to A8 are at least one first antenna sub-array corresponding to the UE 423. It is assumed that a preset value is 2, or the preset value is 2, A1 and A2 are at least one first antenna sub-array corresponding to the UF 421, A5 is at least one first antenna sub-array corresponding to the UE 422, and A7 is at least one first antenna sub-array corresponding to the UE 423.

In the implementation 3, according to the degrees of matching indicated by the matching matrix, it is possible that a terminal device does not match any second antenna sub-array. In other words, the network device does not have a first antenna sub-array corresponding to the terminal device. As shown in table 1, the UE 424 does not have a corresponding first antenna sub-array.

Compared with the foregoing implementation 2, in the implementation 3, the matching matrix may indicate a degree of matching of a finer granularity. In this way, the first information indicates a degree of matching between one second antenna sub-array and the $i^{th}$ terminal device more accurately. In comparison with the foregoing implementation 1, it is easier for the network device and/or the $i^{th}$ terminal device to determine, based on the matching matrix shown in the implementation 3, the first antenna sub-array corresponding to the $i^{th}$ terminal device. This improves processing efficiency.

It should be noted that the foregoing implementation 1 to implementation 3 are described by using an example in which the implementation 1 to the implementation 3 are applied to a scenario of centralized and large-scale antennas. This does not constitute any limitation on this application. For example, this application may be further applied to a scenario of distributed and large-scale antennas. For example, the network device in the implementation 1 to the implementation 3 may be the network device 510 shown in FIG. 5, and the n terminal devices may be the terminal device 520 shown in FIG. 5.

In addition, quantities of terminal devices and network devices are not limited in the implementation 1 and the implementation 2. For example, in the scenario of the distributed and large-scale antennas shown in FIG. 5, the n terminal devices may be a plurality of terminal devices.

In some embodiments, the first terminal device may determine a first SRS sequence based on the matching matrix, and send the first SRS sequence to the network device. For example, after obtaining the matching matrix of the network device, the first terminal device determines, based on the matching matrix, at least one first antenna sub-array corresponding to the first terminal device and generates the first SRS sequence based on a reuse status of the at least one first antenna sub-array. For example, refer to table 2. The at least one first antenna sub-array corresponding to the UE 421 is A1 to A4, and the at least one first antenna sub-array corresponding to the UE 423 is A5 to A8. This may be described as that antenna sub-arrays of the UE 421 are orthogonal or approximately orthogonal to antenna sub-arrays the UE 423. In this case, the UE 421 and the UE 423 may reuse a pilot, in other words, the UE 421 and the UE 423 may send the same first SRS sequence. This resolves problems of a long sequence and large pilot overheads caused by poor orthogonality of SRS sequences in a full-array antenna scenario, to ensure channel estimation performance.

The following uses an example to describe an SRS sequence set included in the first information.

The SRS sequence set may be referred to as an SRS codebook. The SRS sequence set is determined based on the at least one first antenna sub-array corresponding separately to the n terminal devices. For example, the SRS sequence set may be determined by the network device based on the at least one first antenna sub-array corresponding separately to the n terminal devices. For example, the network device may determine a reuse status of each of the plurality of antenna sub-arrays based on an antenna detection result or the matching matrix generated based on an antenna detection result. Table 2 is used as an example. The network device determines that the at least one first antenna sub-array corresponding to the UF 421 is A1 to A4, and the at least one first antenna sub-array corresponding to the UE 423 is A5 to A8. In this case, the UE 421 and the UE 423 may reuse the pilots. Further, the network device generates, based on the reuse status of each of the plurality of antenna sub-arrays, the SRS sequence set corresponding to the $i^{th}$ terminal device.

It should be noted that the SRS sequence set includes at least one SRS sequence. Each SRS sequence in the SRS sequence set corresponding to the $i^{th}$ terminal device may be used for information communication with the $i^{th}$ terminal device through at least one first antenna sub-array corresponding to the $i^{th}$ terminal device. For example, the $i^{th}$ terminal device may select the first SRS sequence from SRS sequences based on configuration information sent by the network device or content defined based on a protocol.

In some embodiments, the first terminal device may send the first SRS sequence to the network device. The first SRS sequence is determined based on the first information. For example, the first SRS sequence may be selected by the first terminal device from the SRS sequence set of the first information, or the first SRS sequence may be determined by the first terminal device based on the matching matrix. A specific implementation is described in the related description of the first SRS sequence in the foregoing embodiment. Details are not described herein again.

In some embodiments, the network device performs channel detection based on the first SRS sequence sent by the first terminal device, to obtain CSI of a downlink channel, and performs downlink precoding on downlink information based on the CSI of the downlink channel.

In S620, the first information sent to the first terminal device by the network device may alternatively be any piece of information indicating the at least one first antenna sub-array corresponding separately to the n terminal devices. For example, refer to FIG. 4. The first information may include identifiers A1 to A4 indicating the at least one first antenna sub-array corresponding to the first terminal device, and/or the first information includes identifiers A5 to A8 of at least one third antenna sub-array that is in the plurality of antenna sub-arrays and that does not correspond to the first terminal device. For the $i^{th}$ terminal device, the at least one third antenna sub-array is an antenna sub-array other than the first antenna sub-array in the plurality of antenna sub-arrays of the network device. Generally, the first information further includes information about at least one first antenna sub-array corresponding separately to a terminal device other than the first terminal device in the n terminal devices.

For example, when the first information includes the SRS sequence set, the first information may further include the matching matrix or any piece of information indicating the at least one first antenna sub-array corresponding separately to the n terminal devices.

Therefore, in this embodiment, the network device and/or the first terminal device determine/determines the at least one first antenna sub-array that is in the plurality of antenna sub-arrays and corresponds to the first terminal device, so that the network device and the first terminal device perform information transmission based on the corresponding at least one first antenna sub-array. In this way, it is less complex for the network device and/or the first terminal device to process a baseband signal, and information communication efficiency is improved.

Further, in this embodiment, detection is performed on the plurality of antenna sub-arrays of the network device based on the first detection signal related to the spatial non-stationary coherence time, to determine the at least one first antenna sub-array corresponding separately to the n terminal devices. In this way, a detection cycle for antenna detection is not limited by channel coherence time, and the detection cycle for antenna detection is more flexible and controllable.

The foregoing describes the method provided in embodiments of this application in detail with reference to FIG. 4 to FIG. 7. The following describes apparatuses provided in embodiments of this application in detail with reference to FIG. 8 and FIG. 9.

Figure 8:
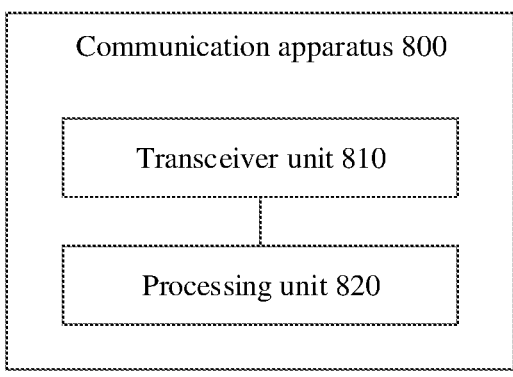
FIG. 8 is a schematic diagram of a structure of an example communication apparatus 800 according to an embodiment of this application.

FIG. 8 is a schematic diagram of a structure of an example communication apparatus 800 according to an embodiment of this application. As shown in FIG. 8, the communication apparatus 800 may include a transceiver unit 810 and a processing unit 820.

Optionally, the communication apparatus 800 may be used in the first terminal device in the foregoing method embodiments, for example, may be the first terminal device, or a component (like a chip, or a chip system) disposed in the first terminal device.

It should be understood that the communication apparatus 800 may be used in the first terminal device in the method 600 according to an embodiment of this application. The communication apparatus 800 may include a unit configured to perform the method performed by the first terminal device in the method 600 in FIG. 6. In addition, units in the communication apparatus 800 and the foregoing other operations and/or functions are separately used to implement corresponding procedures of the method 600 in FIG. 6.

When the communication apparatus 800 is used to perform the method 600 shown in FIG. 6, the transceiver unit 810 is configured to send a first detection signal to a network device. The first detection signal is used to determine at least one first antenna sub-array corresponding to the communication apparatus 800. A plurality of antenna sub-arrays of the network device include the at least one first antenna sub-array. A time interval at which the first detection signal is sent is related to spatial non-stationary coherence time. The transceiver unit 810 is further configured to obtain first information from the network device. The first information indicates to perform information transmission through the at least one first antenna sub-array corresponding to the first terminal device. The processing unit 820 is configured to determine the at least one first antenna sub-array based on the first information.

In some embodiments, the time interval at which the first detection signal is sent is shorter than the spatial non-stationary coherence time.

In a possible implementation, the first information includes a matching matrix. The matching matrix indicates at least one first antenna sub-array that is in the plurality of antenna sub-arrays and corresponds to each of n terminal devices. The n terminal devices include the communication apparatus. The matching matrix includes a plurality of matching elements. The matching element indicates a degree of matching between an $i^{th}$ terminal device in the n terminal devices and a second antenna sub-array in the plurality of antenna sub-arrays. The second antenna sub-array is one of the plurality of antenna sub-arrays. $n \geq 1$, and n is an integer. $n \geq i \geq 1$, and i is an integer.

In some embodiments, the degree of matching is related to signal strength of first strength of the first detection signal obtained by the second antenna sub-array, the matching element indicates a result of comparison between signal strength of the first detection signal obtained by the second antenna sub-array and a first threshold, or the matching element indicates results of comparison between signal strength of the first detection signal obtained by the second antenna sub-array and a plurality of threshold ranges.

In some embodiments, the matching element indicates the signal strength of the first detection signal received by the second antenna sub-array. When the matching element is greater than or equal to a second threshold, the second antenna sub-array is the first antenna sub-array that performs information transmission with the terminal device.

In some embodiments, when the signal strength of the first detection signal is greater than or equal to the first threshold, the matching element is a first character. The first character indicates that the second antenna sub-array is the first antenna sub-array that performs information transmission with the terminal device. Alternatively, when the signal strength of the first detection signal is less than the first threshold, the matching element is a second character. The second character indicates that the second antenna sub-array is not the first antenna sub-array that performs information transmission with the terminal device.

In some embodiments, the plurality of threshold ranges one-to-one correspond to a plurality of degrees of matching. The matching element is a character corresponding to a threshold range within which the signal strength of the first detection signal falls. The character corresponding to the threshold range indicates a degree of matching corresponding to the threshold range.

In some embodiments, the first information includes a channel sounding reference signal SRS sequence set. The SRS sequence set is determined based on the at least one first antenna sub-array corresponding separately to the n terminal devices. The n terminal devices include the communication apparatus. $n \geq 1$, and n is an integer.

In some embodiments, the transceiver unit 810 is further configured to send a first SRS sequence to the network device. The first SRS sequence is determined based on the first information.

It should be understood that a specific procedure in which the units perform the foregoing corresponding steps is described in detail in the foregoing method embodiments. For brevity, details are not described herein again.

Figure 9:
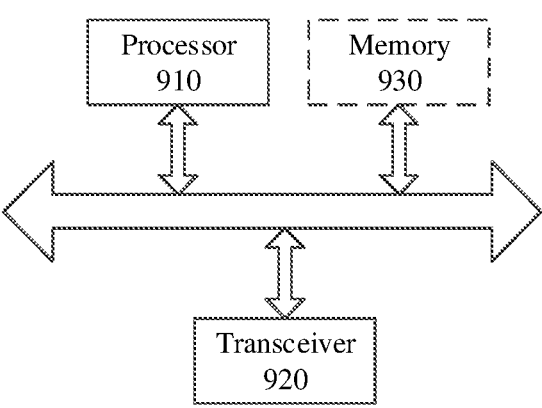
FIG. 9 is another schematic block diagram of an example communication apparatus 900 according to an embodiment of this application.

When the communication apparatus 800 is the first terminal device, the transceiver unit 810 in the communication apparatus 800 may be implemented by using a transceiver, for example, may correspond to a transceiver 920 in a communication apparatus 900 shown in FIG. 9. The processing unit 820 in the communication apparatus 800 may be implemented by using a processor, for example, may correspond to a processor 910 in the communication apparatus 900 shown in FIG. 9.

When the communication apparatus 800 is a chip or a chip system disposed in the first terminal device, both the transceiver unit 810 and the processing unit 820 in the communication apparatus 800 may be implemented by using an input/output interface, a circuit, or the like.

Optionally, the communication apparatus 800 may correspond to the network device in the foregoing method embodiments, for example, may be a network device or a component (for example, a chip or a chip system) disposed in the network device.

It should be understood that the communication apparatus 800 may correspond to the network device in the scenario 200 according to an embodiment of this application, and the communication apparatus 800 may include a unit configured to perform the method performed by the network device in the method 600 in FIG. 6. In addition, the units in the communication apparatus 800 and the foregoing other operations and/or functions are separately used to implement corresponding procedures of the method in FIG. 6.

When the communication apparatus 800 is configured to perform the method 600 in FIG. 6, the transceiver unit 810 may be configured to obtain, through a plurality of antenna sub-arrays, a first detection signal sent by an $i^{th}$ terminal device in n terminal devices. The first detection signal is used to determine at least one first antenna sub-array corresponding to the $i^{th}$ terminal device. The plurality of antenna sub-arrays include the at least one first antenna sub-array. A time interval at which the first detection signal is sent is related to spatial non-stationary coherence time. $n \geq 1$, and is an integer. $n \geq i \geq 1$, and i is an integer. The processing unit 820 may be configured to determine first information based on first detection signals sent respectively by the n terminal devices. The first information indicates to perform information transmission through the at least one first antenna sub-array corresponding to the $i^{th}$ terminal device. The transceiver unit 810 is further configured to send the first information to the $i^{th}$ terminal device.

In some embodiments, the time interval at which the first detection signal is sent is shorter than the spatial non-stationary coherence time.

In some embodiments, the first information includes a matching matrix. The matching matrix indicates at least one first antenna sub-array that is in the plurality of antenna sub-arrays and corresponds to each of the n terminal devices. The matching matrix includes a plurality of matching elements. The matching element indicates a degree of matching between an $i^{th}$ terminal device and a second antenna sub-array in the plurality of antenna sub-arrays. The second antenna sub-array is one of the plurality of antenna sub-arrays.

In some embodiments, the degree of matching is related to signal strength of first strength of the first detection signal obtained by the second antenna sub-array, the matching element indicates a result of comparison between signal strength of the first detection signal obtained by the second antenna sub-array and a first threshold, or the matching element indicates results of comparison between signal strength of the first detection signal obtained by the second antenna sub-array and a plurality of threshold ranges.

In some embodiments, the matching element indicates the signal strength of the first detection signal obtained by the second antenna sub-array. When the matching element is greater than or equal to a second threshold, the second antenna sub-array is the first antenna sub-array that performs information transmission with the terminal device.

In some embodiments, when the signal strength of the first detection signal is greater than or equal to the first threshold, the matching element is a first character. The first character indicates that the second antenna sub-array is the first antenna sub-array that performs information transmission with the terminal device. Alternatively, when the signal strength of the first detection signal is less than the first threshold, the matching element is a second character. The second character indicates that the second antenna sub-array is not the first antenna sub-array that performs information transmission with the terminal device.

In some embodiments, the plurality of threshold ranges one-to-one correspond to a plurality of degrees of matching. The matching element is a character corresponding to a threshold range within which the signal strength of the first detection signal falls. The character corresponding to the threshold range indicates a degree of matching corresponding to the threshold range.

In some embodiments, the first information includes an SRS sequence set. The SRS sequence set is determined based on the at least one first antenna sub-array corresponding separately to the n terminal devices.

In some embodiments, the transceiver unit 810 is further configured to receive, through the at least one first antenna sub-array corresponding to the $i^{th}$ terminal device in the n terminal devices, a first SRS sequence sent by the terminal device. The first SRS sequence is determined based on the first information.

It should be further understood that a specific procedure in which the units perform the foregoing corresponding steps is described in detail in the foregoing method embodiments. For brevity, details are not described herein again.

When the communication apparatus 800 is the network device, the transceiver unit 810 in the communication apparatus 800 may be implemented by using a transceiver, for example, may correspond to the transceiver 920 in the communication apparatus 900 shown in FIG. 9. The processing unit 820 in the communication apparatus 800 may be implemented by using a processor, for example, may correspond to the processor 910 in the communication apparatus 900 shown in FIG. 9.

When the communication apparatus 800 is a chip or a chip system disposed in the terminal device, both the transceiver unit 810 and the processing unit 820 in the communication apparatus 800 may be implemented by using an input/output interface, a circuit, or the like.

FIG. 9 is another schematic block diagram of an example communication apparatus 900 according to an embodiment of this application. As shown in FIG. 9, the apparatus 900 may include the processor 910, the transceiver 920, and a memory 930. The processor 910, the transceiver 920, and the memory 930 communicate with each other by using an internal connection path. The memory 930 is configured to store instructions. The processor 910 is configured to execute the instructions stored in the memory 930, to control the transceiver 920 to send a signal and/or to receive a signal.

It should be understood that the communication apparatus 900 may correspond to the first terminal device or the network device in the foregoing method embodiments, and may be configured to perform steps and/or procedures performed by the first terminal device or the network device in the foregoing method embodiments. Optionally, the memory 930 may include a read-only memory and a random access memory, and provide the instructions and data for the processor. A part of the memory may further include a non-volatile random access memory. The memory 930 may be an independent device, or may be integrated into the processor 910. The processor 910 may be configured to execute the instructions stored in the memory 930. When the processor 910 executes the instructions stored in the memory, the processor 910 is configured to perform steps and/or procedures in the method embodiment corresponding to the first terminal device or the network device.

Optionally, the communication apparatus 900 is the first terminal device in the foregoing embodiments.

Optionally, the communication apparatus 900 is the network device in the foregoing embodiments.

The transceiver 920 may include a transmitter and a receiver. The transceiver 920 may further include an antenna, and there may be one or more antennas. The processor 910, the memory 930, and the transceiver 920 may be components integrated into different chips. For example, the processor 910 and the memory 930 may be integrated into a baseband chip, and the transceiver 920 may be integrated into a radio frequency chip. Alternatively, the processor 910, the memory 930, and the transceiver 920 may be components integrated into a same chip. This is not limited in this application.

Optionally, the communication apparatus 900 is a component, for example, a chip or a chip system, disposed in the first terminal device.

Optionally, the communication apparatus 900 is a component, for example, a chip or a chip system, disposed in the network device.

Alternatively, the transceiver 920 may be a communication interface, for example. an input/output interface or a circuit. The transceiver 920, the processor 910, and the memory 930 may be integrated into a same chip, for example, integrated into a baseband chip.

Figure 10:
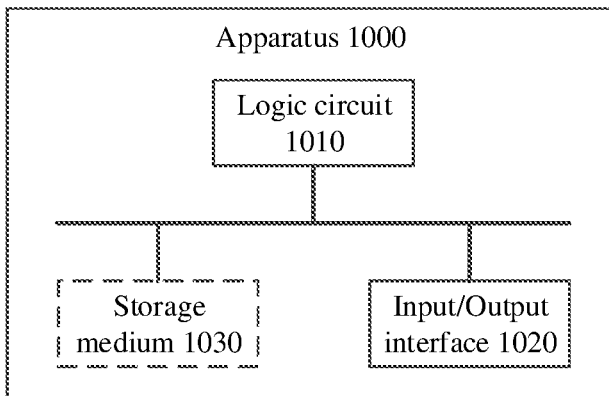
FIG. 10 is a schematic block diagram of an example apparatus 1000 according to an embodiment of this application.

FIG. 10 is a schematic block diagram of an example apparatus 1000 according to an embodiment of this application. The apparatus 1000 includes a logic circuit 1010 and an input/output interface 1020. The logic circuit 1010 and the input/output interface 1020 communicate with each other by using an internal connection path. The logic circuit 1010 is configured to execute instructions, to control the input/output interface 1020 to send a signal and/or receive a signal. The input/output interface 1020 is configured to receive a signal from a communication apparatus other than the apparatus 1000 and transmit the signal to the logic circuit 1010, or send a signal from the logic circuit 1010 to a communication apparatus other than the apparatus 1000.

Optionally, the apparatus 1000 may further include a storage medium 1030. The storage medium 1030 communicates with the logic circuit 1010 and the input/output interface 1020 by using the internal connection path. The storage medium 1030 is configured to store instructions, and the logic circuit 1010 may execute the instructions stored in the storage medium 1030. In a possible implementation, the apparatus 1000 is configured to implement procedures and steps corresponding to the network device in the foregoing method embodiment. In another possible implementation, the apparatus 1000 is configured to implement procedures and steps corresponding to the first terminal device in the foregoing method embodiment.

This application further provides a processing apparatus, including at least one processor The at least one processor is configured to execute a computer program stored in a memory, so that the processing apparatus performs the method performed by the first terminal device in the foregoing method embodiment or the method performed by the network device in the foregoing method embodiment.

Embodiments of this application further provide a processing apparatus, including a processor and a memory. The memory is configured to store a computer program, and the processor is configured to invoke the computer program from the memory and run the computer program, so that the processing apparatus performs the method performed by the first terminal device in the foregoing method embodiment or the method performed by the network device in the foregoing method embodiment.

It should be understood that the processing apparatus may be one or more chips. For example, the processing apparatus may be a field programmable gate array (FPGA), an application-specific integrated chip (ASIC), a system on chip (SoC), a central processing unit (CPU), a network processor (NP), a digital signal processing circuit (DSP), a microcontroller (MCU), a programmable controller (PLD). or another integrated chip.

In an implementation process, steps in the foregoing methods can be implemented by using a hardware integrated logical circuit in the processor, or by using instructions in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It may be understood that the memory in this embodiment may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

According to the methods provided in embodiments of this application, this application further provides a computer program product. The computer program product includes computer program code. When the computer program code is run on a computer, the computer is enabled to perform the method performed by the first terminal device or the network device.

According to the methods provided in embodiments of this application, this application further provides a computer-readable storage medium. The computer-readable storage medium stores program code. When the program code is run on a computer, the computer is enabled to perform the method performed by the first terminal device or the network device.

According to the methods provided in embodiments of this application, this application further provides a communication system. The communication system may include the foregoing first terminal device and network device.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk drive, a read-only memory (ROM), a random access memory (RAM), a magnetic disk, or an optical disc.

The foregoing descriptions are merely non-limiting examples of specific implementations and are not intended to limit the protection scope, which is intended to cover any variation or replacement readily determined by a person of ordinary skill in the art. Therefore, the claims shall define the protection scope.

What is claimed is:

1. An antenna detection method, comprising:
sending, by a first terminal device, a first detection signal for determining at least one first antenna sub-array corresponding to the first terminal device, a plurality of antenna sub-arrays of a network device comprise the at least one first antenna sub-array, and a time interval at which the first detection signal is sent is related to spatial non-stationary coherence time; and
obtaining, by the first terminal device, first information indicating to perform information transmission through the at least one first antenna sub-array corresponding to the first terminal device.

2. The method according to claim 1, wherein the time interval at which the first detection signal is sent is shorter than the spatial non-stationary coherence time.

3. The method according to claim 1, wherein the first information comprises a matching matrix, the matching matrix indicates at least one first antenna sub-array that is in the plurality of antenna sub-arrays and corresponds to each of n terminal devices, the n terminal devices comprise the first terminal device, the matching matrix comprises a plurality of matching elements, each of the plurality of matching elements indicates a degree of matching between an $i^{th}$ terminal device in the n terminal devices and a second antenna sub-array in the plurality of antenna sub-arrays, the second antenna sub-array is one of the plurality of antenna sub-arrays, n is an integer greater than or equal to 1, and i is an integer less than or equal to n and greater than or equal to 1.

4. The method according to claim 3, wherein the degree of matching is related to signal strength of first sounding signal obtained by the second antenna sub-array; and
the matching element indicates signal strength of the first detection signal obtained by the second antenna sub-array,
the matching element indicates a result of comparison between signal strength of the first detection signal obtained by the second antenna sub-array and a first threshold, or
the matching element indicates results of comparison between signal strength of the first detection signal obtained by the second antenna sub-array and a plurality of threshold ranges.

5. The method according to claim 4, wherein the matching element indicates the signal strength of the first detection signal received by the second antenna sub-array, and when the matching element is greater than or equal to a second threshold, the second antenna sub-array is the first antenna sub-array that performs information transmission with the $i^{th}$ terminal device.

6. The method according to claim 4, wherein
when the signal strength of the first detection signal is greater than or equal to the first threshold, the matching element is a first character indicating that the second antenna sub-array is the first antenna sub-array that performs information transmission with the $i^{th}$ terminal device; or when the signal strength of the first detection signal is less than the first threshold, the matching element is a second character, and the second character indicating that the second antenna sub-array is not the first antenna sub-array that performs information transmission with the $i^{th}$ terminal device.

7. The method according to claim 4, wherein the plurality of threshold ranges one-to-one correspond to a plurality of degrees of matching; and the matching element is a character corresponding to a threshold range within which the signal strength of the first detection signal falls, and the character corresponding to the threshold range indicates a degree of matching corresponding to the threshold range.

8. An antenna detection method, comprising:

obtaining, through a plurality of antenna sub-arrays, a first detection signal sent by an $i^{th}$ terminal device in n terminal devices, wherein the first detection signal is for determining at least one first antenna sub-array corresponding to the $i^{th}$ terminal device, the plurality of antenna sub-arrays comprise the at least one first antenna sub-array, and a time interval at which the first detection signal is sent is related to spatial non-stationary coherence time, n is an integer greater than or equal to 1, and i is an integer less than or equal to n and greater than or equal to 1; and sending first information to the $i^{th}$ terminal device, wherein the first information indicates to perform information transmission through the at least one first antenna sub-array corresponding to the $i^{th}$ terminal device.

9. The method according to claim 8, wherein the time interval at which the first detection signal is sent is shorter than the spatial non-stationary coherence time.

10. The method according to claim 8, wherein the first information comprises a matching matrix, the matching matrix indicates at least one first antenna sub-array that is in the plurality of antenna sub-arrays and corresponds to each of the n terminal devices, the matching matrix comprises a plurality of matching elements, each of the plurality of matching elements indicates a degree of matching between the $i^{th}$ terminal device and a second antenna sub-array in the plurality of antenna sub-arrays, and the second antenna sub-array is one of the plurality of antenna sub-arrays.

11. The method according to claim 10, wherein the degree of matching is related to signal strength of first detection signal obtained by the second antenna sub-array; and the matching element indicates signal strength of the first detection signal obtained by the second antenna sub-arrays, the matching element indicates a result of comparison between signal strength of the first detection signal obtained by the second antenna sub-array and a first threshold, or the matching element indicates results of comparison between signal strength of the first detection signal obtained by the second antenna sub-array and a plurality of threshold ranges.

12. The method according to claim 11, wherein the matching element indicates the signal strength of the first detection signal obtained by the second antenna sub-array, and when the matching element is greater than or equal to a second threshold, the second antenna sub-array is the first antenna sub-array that performs information transmission with the ith terminal device.

13. The method according to claim 11, wherein when the signal strength of the first detection signal is greater than or equal to the first threshold, the matching element is a first character indicating that the second antenna sub-array is the first antenna sub-array that performs information transmission with the ith terminal device; or when the signal strength of the first detection signal is less than the first threshold, the matching element is a second character indicating that the second antenna sub-array is not the first antenna sub-array that performs information transmission with the ith terminal device.

14. The method according to claim 11, wherein the plurality of threshold ranges one-to-one correspond to a plurality of degrees of matching; and the matching element is a character corresponding to a threshold range within which the signal strength of the first detection signal falls, and the character corresponding to the threshold range indicates a degree of matching corresponding to the threshold range.

15. A communication apparatus, comprising:

at least one processor;

a communication interface; and a memory storing instructions that, when executed by the at least one processor, cause the communication apparatus to:

send a first detection signal for determining at least one first antenna sub-array corresponding to the communication apparatus, a plurality of antenna sub-arrays of a network device comprise the at least one first antenna sub-array, and a time interval at which the first detection signal is sent is related to spatial non-stationary coherence time; and obtain first information indicating to perform information transmission through the at least one first antenna sub-array corresponding to the communication apparatus.

16. The communication apparatus according to claim 15, wherein the time interval at which the first detection signal is sent is shorter than the spatial non-stationary coherence time.

17. The communication apparatus according to claim 15, wherein the first information comprises a matching matrix indicating at least one first antenna sub-array that is in the plurality of antenna sub-arrays and corresponds to each of n terminal devices, the n terminal devices comprise the communication apparatus, the matching matrix comprises a plurality of matching elements, each of the plurality of matching elements indicates a degree of matching between an $i^{th}$ terminal device in the n terminal devices and a second antenna sub-array in the plurality of antenna sub-arrays, the second antenna sub-array is one of the plurality of antenna sub-arrays, n is an integer greater than or equal to 1, and i is an integer less than or equal to n and greater than or equal to 1.

18. The communication apparatus according to claim 17, wherein the degree of matching is related to signal strength of first sounding signal obtained by the second antenna sub-array; and the matching element indicates signal strength of the first detection signal obtained by the second antenna sub-array;

the matching element indicates a result of comparison between signal strength of the first detection signal obtained by the second antenna sub-array and a first threshold, or the matching element indicates results of comparison between signal strength of the first detection signal obtained by the second antenna sub-array and a plurality of threshold ranges.

19. The communication apparatus according to claim 18, wherein the matching element indicates the signal strength of the first detection signal received by the second antenna sub-array, and when the matching element is greater than or equal to a second threshold, the second antenna sub-array is the first antenna sub-array that performs information transmission with the ith terminal device; or wherein the plurality of threshold ranges one-to-one correspond to a plurality of degrees of matching; and the matching element is a character corresponding to a threshold range within which the signal strength of the first detection signal falls, and the character corresponding to the threshold range indicates a degree of matching corresponding to the threshold range.

20. The communication apparatus according to claim 18, wherein when the signal strength of the first detection signal is greater than or equal to the first threshold, the matching element is a first character indicating that the second antenna sub-array is the first antenna sub-array that performs information transmission with the ith terminal device; or when the signal strength of the first detection signal is less than the first threshold, the matching element is a second character indicating that the second antenna sub-array is not the first antenna sub-array that performs information transmission with the ith terminal device.

\* \* \* \* \*